Aug. 14, 1962 M. J. GARVEY ET AL 3,049,293

CALCULATING MACHINE ADAPTED FOR NUMBER CHECKING DEVICE

Filed June 24, 1960 9 Sheets-Sheet 1

INVENTORS
MARK J. GARVEY
WALTER U. ANDREWS

BY Louis A Kline
Wilbert Hawk, Jr.

THEIR ATTORNEYS

Aug. 14, 1962 M. J. GARVEY ET AL 3,049,293

CALCULATING MACHINE ADAPTED FOR NUMBER CHECKING DEVICE

Filed June 24, 1960 9 Sheets-Sheet 2

INVENTORS
MARK J. GARVEY
WALTER U. ANDREWS

BY Louis A. Kline
Wilbert Hawk, Jr.

THEIR ATTORNEYS

INVENTORS
MARK J. GARVEY
WALTER U. ANDREWS
BY Louis A Kline
Wilbert Hawk, Jr.
THEIR ATTORNEYS

CALCULATING MACHINE ADAPTED FOR NUMBER CHECKING DEVICE

Filed June 24, 1960 9 Sheets-Sheet 4

INVENTORS
MARK J. GARVEY
WALTER U. ANDREWS
BY Louis A Kline
Wilbert Hawk, Jr.
THEIR ATTORNEYS Aug. 14, 1962 M. J. GARVEY ET AL 3,049,293

CALCULATING MACHINE ADAPTED FOR NUMBER CHECKING DEVICE

Filed June 24, 1960 9 Sheets-Sheet 5

INVENTORS
MARK J. GARVEY
WALTER U. ANDREWS
BY Louis A. Kline
Wilbert Hawk, Jr.
THEIR ATTORNEYS Aug. 14, 1962 M. J. GARVEY ET AL 3,049,293

CALCULATING MACHINE ADAPTED FOR NUMBER CHECKING DEVICE

Filed June 24, 1960 9 Sheets-Sheet 6

INVENTORS
MARK J. GARVEY
WALTER U. ANDREWS
BY Louis A Kline
Wilbert Hawk, Jr.
THEIR ATTORNEYS Aug. 14, 1962 M. J. GARVEY ET AL 3,049,293

CALCULATING MACHINE ADAPTED FOR NUMBER CHECKING DEVICE

Filed June 24, 1960 9 Sheets-Sheet 7

INVENTORS
MARK J. GARVEY
WALTER U. ANDREWS
BY Louis A. Kline
Wilbert Hawk, Jr.
THEIR ATTORNEYS

CALCULATING MACHINE ADAPTED FOR NUMBER CHECKING DEVICE

Filed June 24, 1960

INVENTORS
MARK J. GARVEY
WALTER U. ANDREWS
BY Louis A. Kline
Wilbert Hawk, Jr.
THEIR ATTORNEYS

CALCULATING MACHINE ADAPTED FOR NUMBER CHECKING DEVICE

Filed June 24, 1960 9 Sheets-Sheet 9

INVENTORS
MARK J. GARVEY
WALTER U. ANDREWS

BY Louis A. Kline
Wilbert Hawk, Jr.
THEIR ATTORNEYS

United States Patent Office 3,049,293

Patented Aug. 14, 1962

3,049,293
CALCULATING MACHINE ADAPTED FOR NUMBER CHECKING DEVICE

Mark J. Garvey and Walter U. Andrews, Ithaca, N.Y., assignors to The National Cash Register Company, Dayton, Ohio, a corporation of Maryland Filed June 24, 1960, Ser. No. 38,506
5 Claims. (Cl. 235—130)

This invention relates to a calculating machine adapted as an input means for entering identification numbers and similar data into an associated number-checking device which, through a predetermined mathematical rule of prescription, determines the accuracy thereof.

In the one particular embodiment of the invention as herein illustrated and described, the basic machine is an add-subtract calculating machine of the general type disclosed in United States Patent No. 2,692,726, which issued to Nelson F. Frieberg and Oscar F. Larsen on October 26, 1954, and to which patent reference may be had for a complete disclosure, although enough of the pertinent mechanism thereof will be described herein to give a thorough understanding of the present invention. The associated number-checking device, herein shown and described as an independent unit, is electrically connected to the calculating machine and comprises structure substantially the same as that disclosed in co-pending applications for Letters Patent of the United States, Serial No. 699,984, filed December 2, 1957, by Peter S. Glaser et al., and Serial No. 773,761, filed November 13, 1958, by Sigmund N. Porter and Robert M. Tink. Reference may also be had to these applications for a complete disclosure of mechanism which is not pertinent to the present invention and which, for that reason, will not be described or illustrated herein.

A typical type of data normally entered on the keyboard of such an input means and into the checking device is that generally termed "account numbers," each of the numbers being employed, for example, to identify or designate specific respective commercial accounts. In banking and similar institutions, it is apparent that accuracy in entering such numbers on various records is of extreme importance, so that debits, credits, and similar data are associated with and postings made to the accounts of proper parties, each of whom has been assigned a specific account or identification number. Also, according to such an institution's particular accounting or data-processing system, a printed record of each account number along with its associated item amount may be desired, and in many instances a particular accounting system may require accurately-prepared records, such as punched tape or cards and the like, in the form of future input means for feeding data into automatic posting and other data-processing machines.

Therefore, it is a primary object of the present invention to provide a calculating machine for entering each account or identification number into an associated checking device and making a printed record of each number so entered.

A further important object of the invention resides in the provision of control means which permits continued operation of the calculating machine for accumulating and preparing a printed record of the item amount associated with each entered account number that conforms to the number checker's predetermined rule or prescription, and which prevents such continued operation of the calculating machine for each account number not conforming therewith. Thus, any error in the account number itself—that is, if the relative values of the entered digits do not present an entire number conforming to the number device rule or prescription—or any error in the process of entering the various digits on the machine keyboard and into the checking device will be detected and required to be corrected before any item amount associated therewith is permitted to be entered into the calculating machine and a printed and/or punched record made thereof.

An additional important object of the invention resides in timing means controlling the sequence of operation between the calculating machine and the number-checking device, permitting a single cycle of operation of the calculating machine for entering the digits of the account number into electrical storage means carried thereby and making a printed record thereof under a non-add type of machine operation; preventing further cycling thereof as the storage means is electrically interrogated by the checking device, which is free to operate for the period of time required in subjecting the digits contained therein to the checking procedure; and then permitting a second cycle of the calculating machine for entering into totalizer mechanism thereof and preparing a printed record of the item amount associated with each entered account number which is approved by the checking device, this second cycle being made under an add type of machine operation.

A still further important object of the invention is the provision of unique mechanism for resetting the control means when an erroneous account or identification number has been entered into the checking device, this means, through a two-cycle operation of the calculating machine, also releasing any digit and type of operation keys which may have been depressed, and conditioning the calculating machine for the entry of a corrected account number.

Still another object of the invention is to provide a visual indicator for calling attention to the entry of an account or identification number which is not approved by the number-checking device and which prevents further cycling of the calculating machine for entry of an item amount associated therewith, thereby requiring a resetting operation to be performed, so that a corrected number may be entered and checked.

With these and incidental objects in view, the invention includes certain novel features of construction and combinations of parts, a preferred form or embodiment of which is hereinafter described with reference to the drawings which accompany and form a part of this specification.

In the drawings:

FIG. 1 is a perspective view of a calculating machine embodying the invention, and of a number-checking device associated therewith, as seen from the left front;

FIGS. 2A and 2B, together, constitute a left side elevational view of the calculating machine with the case removed and with numerous parts not pertinent to the present invention also removed;

Figure 1:
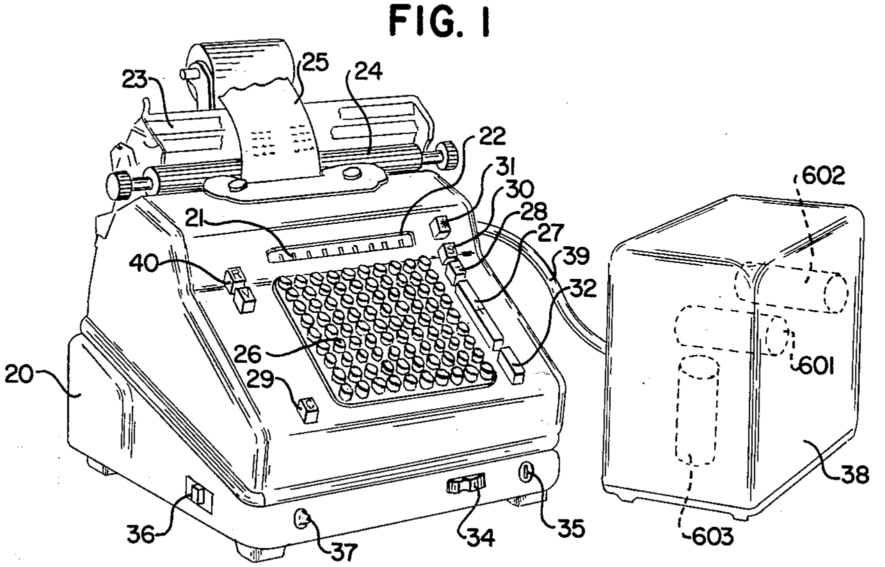
Figures 13, 14, 15:
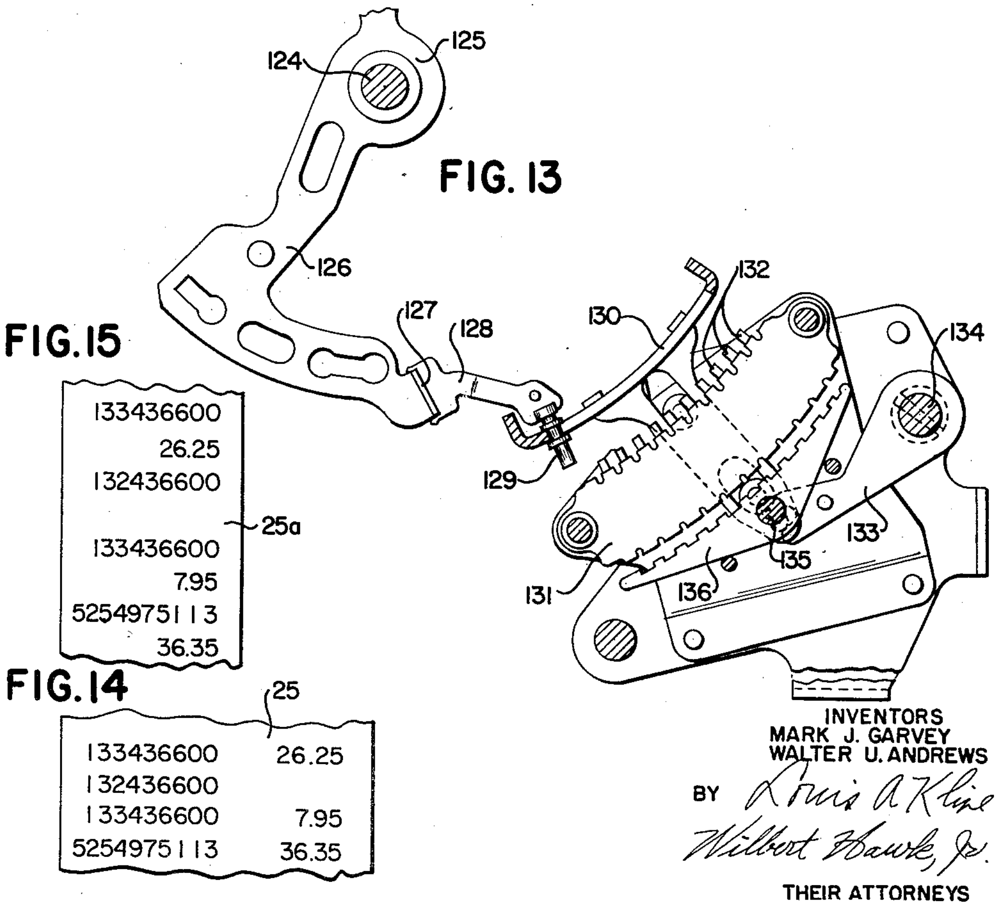
Figures 2A, 8:
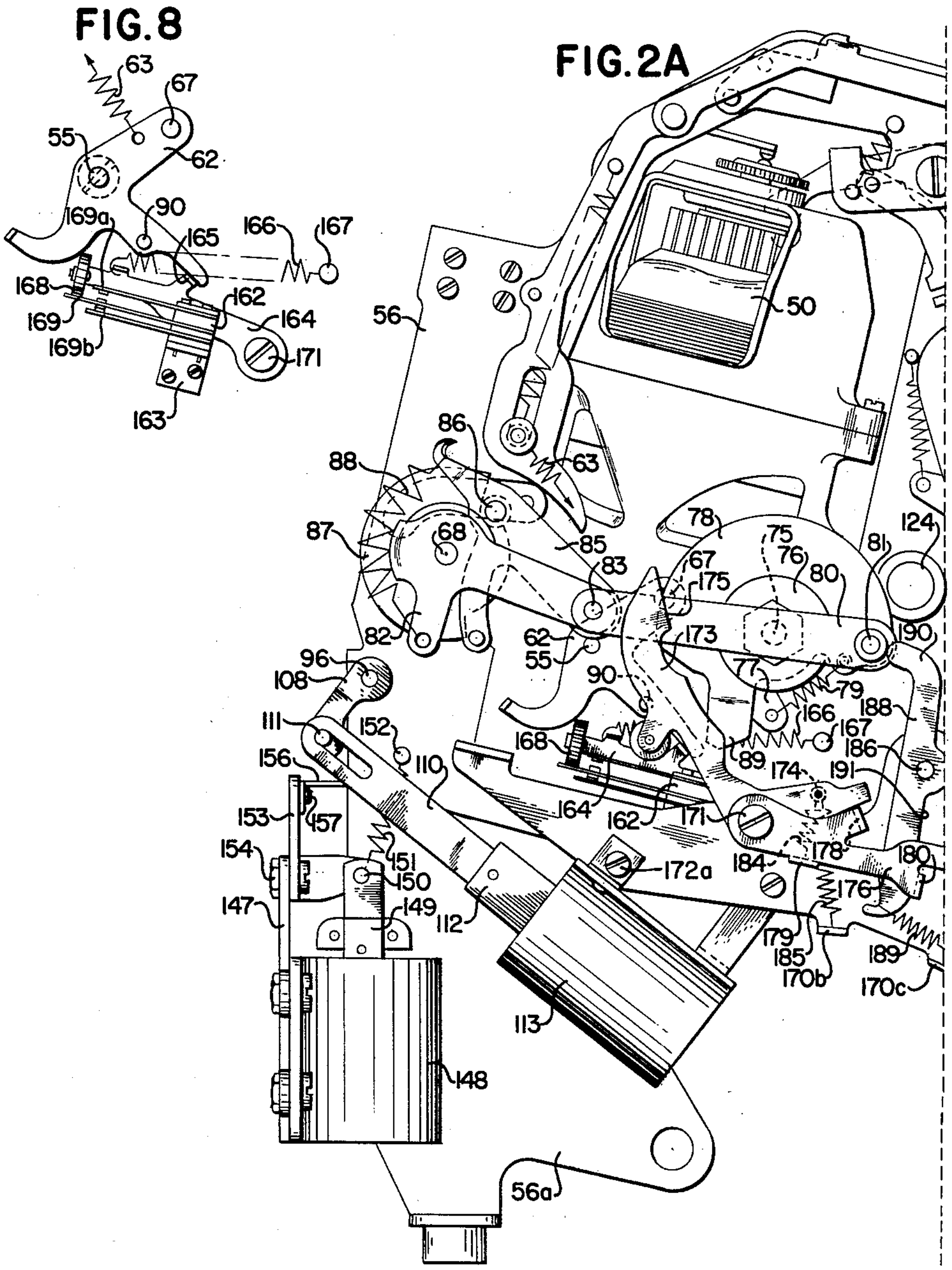
Figure 2B:
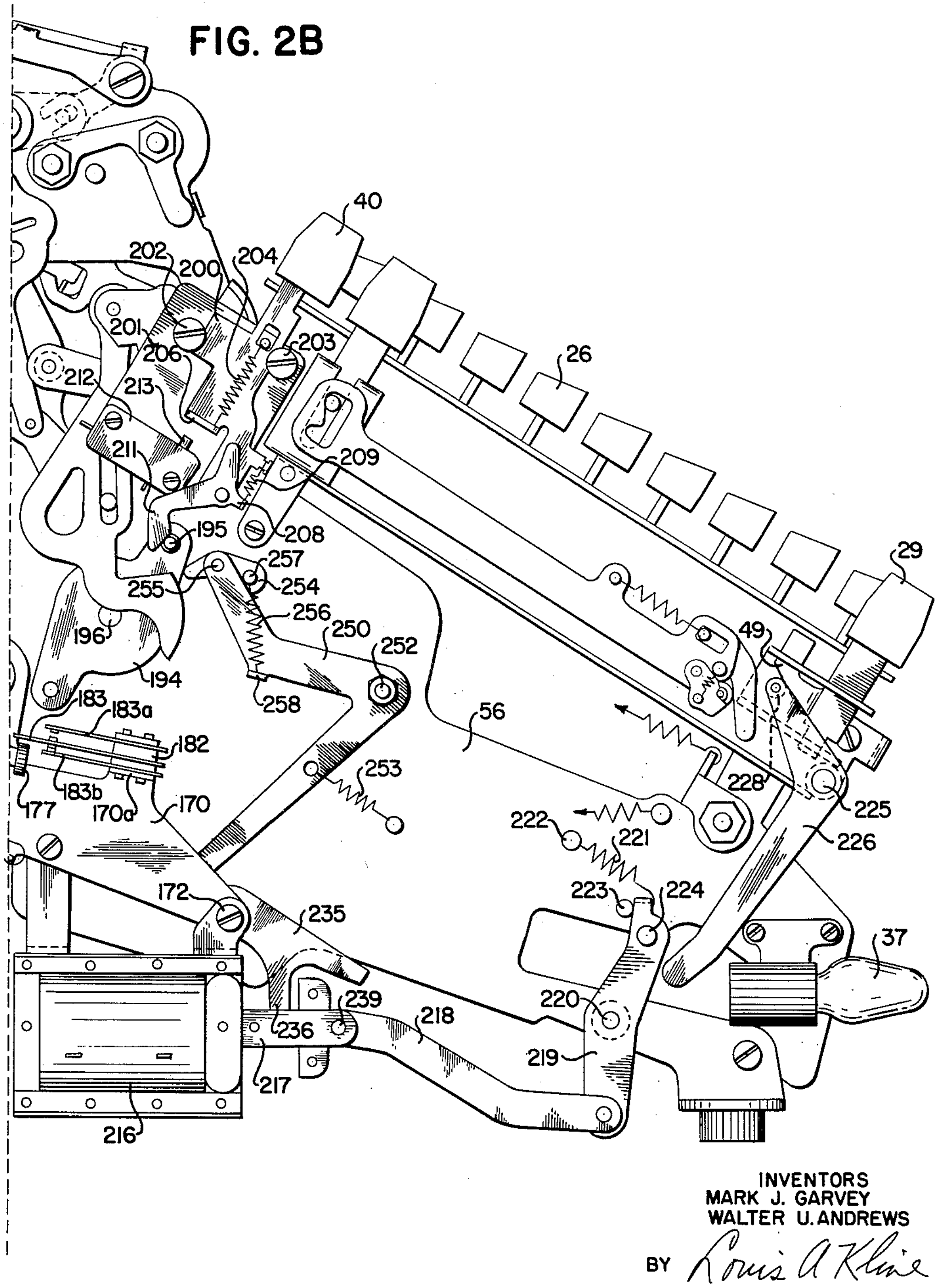
Figures 3, 9:
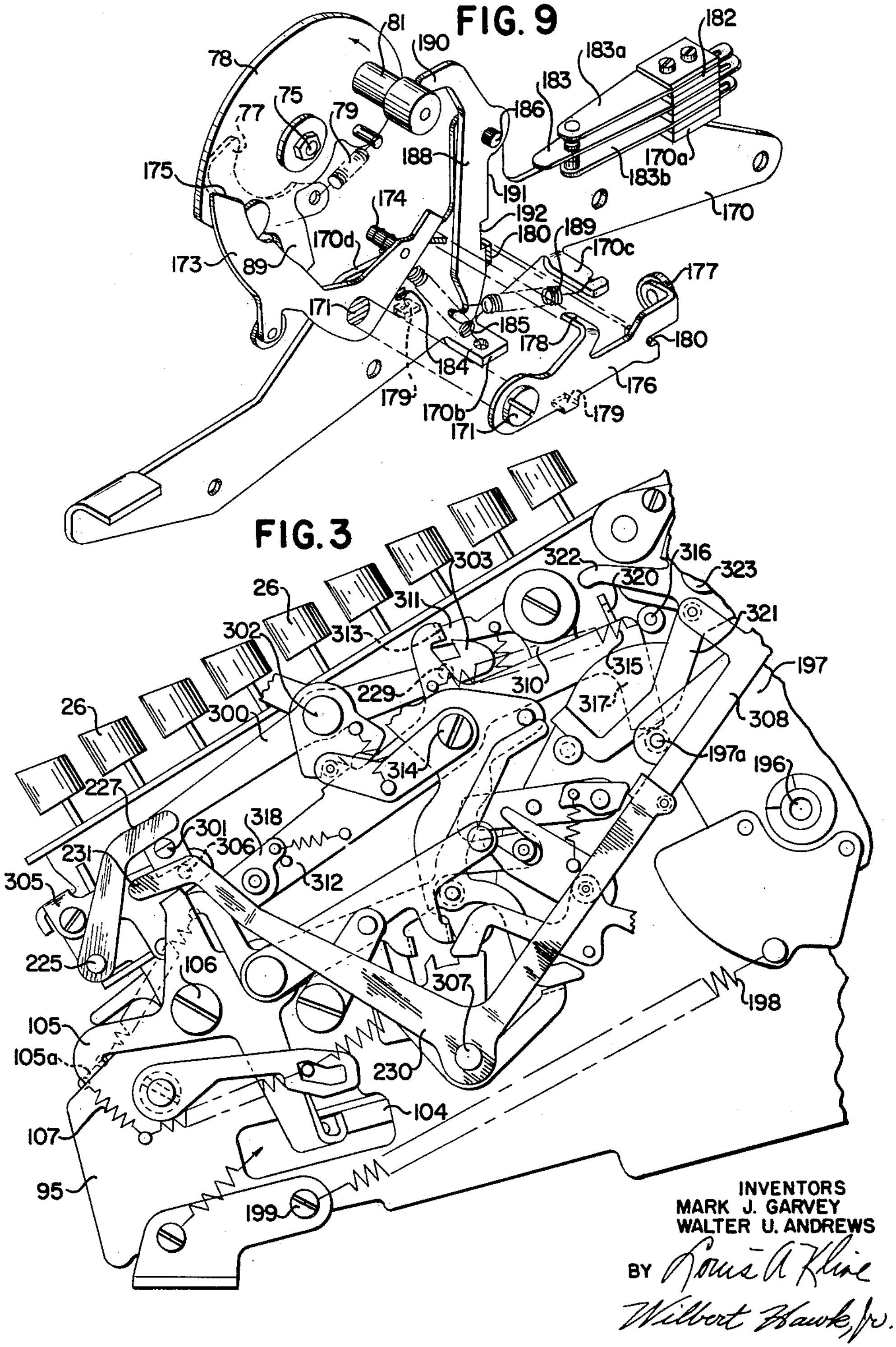
FIG. 3 is a fragmentary view, in side elevation, of a front portion of the right vertical frame plate of the machine, with particular reference to the mechanism located on the outside thereof.
Figures 10, 12:
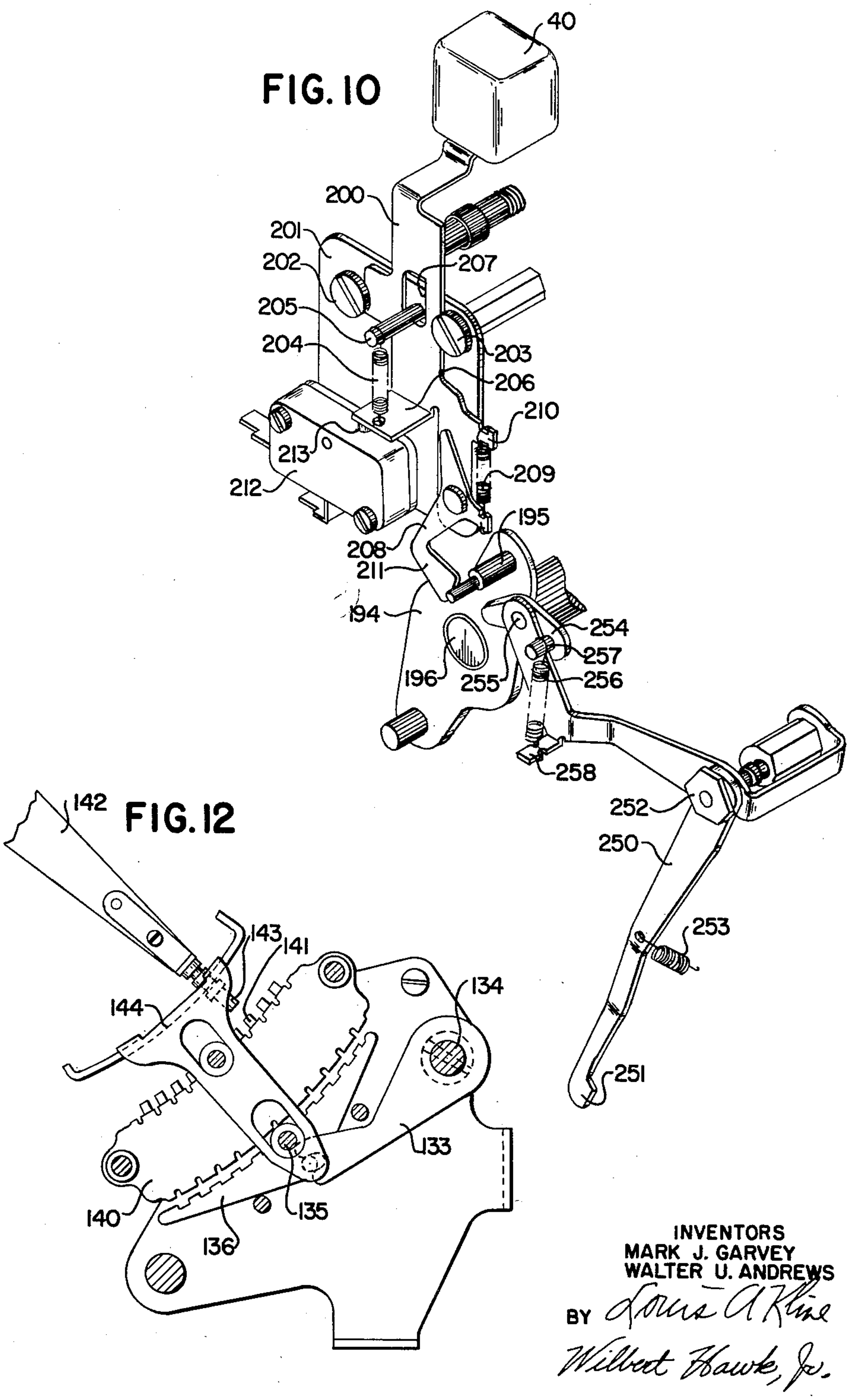
Figure 11:
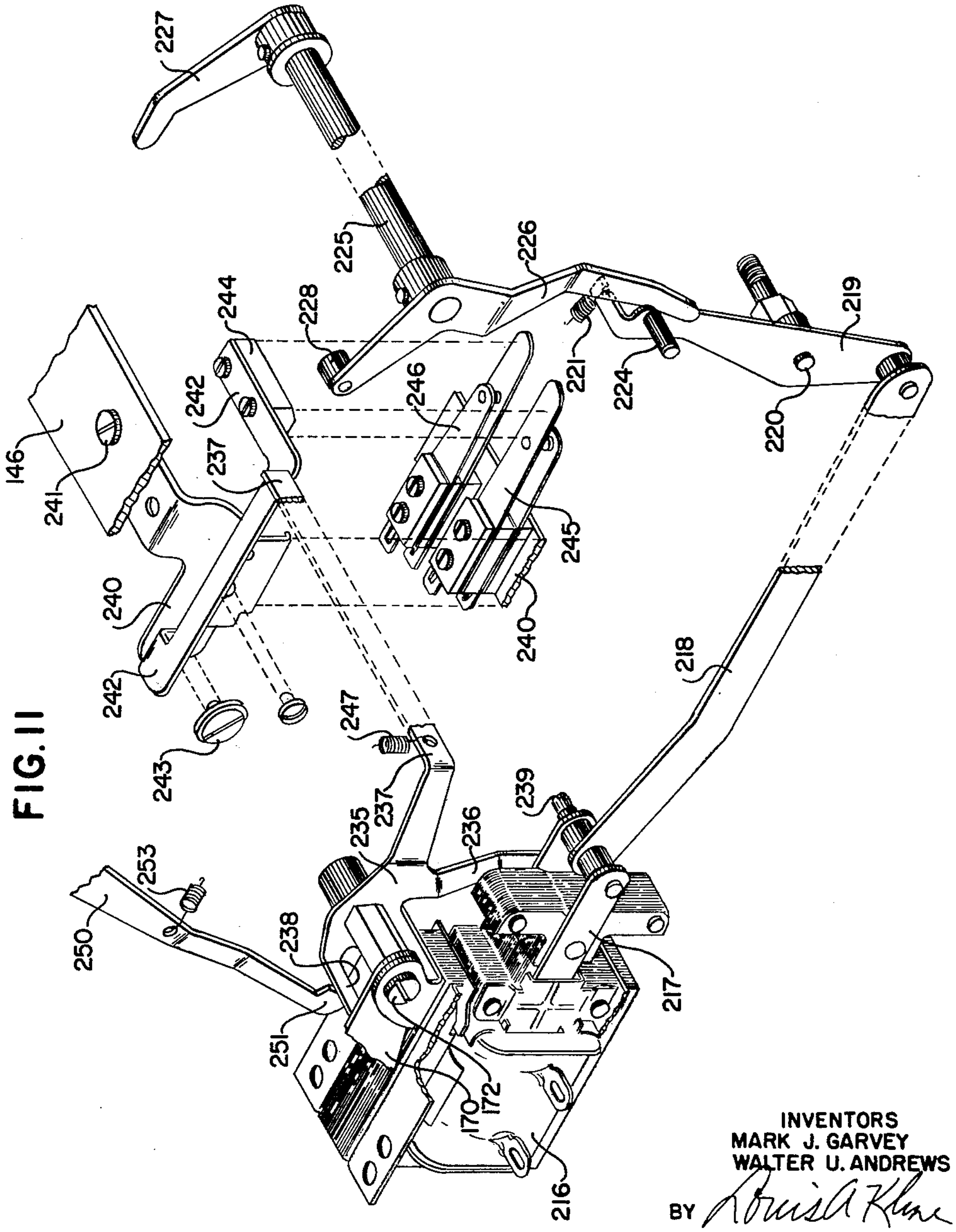
Figure 16:
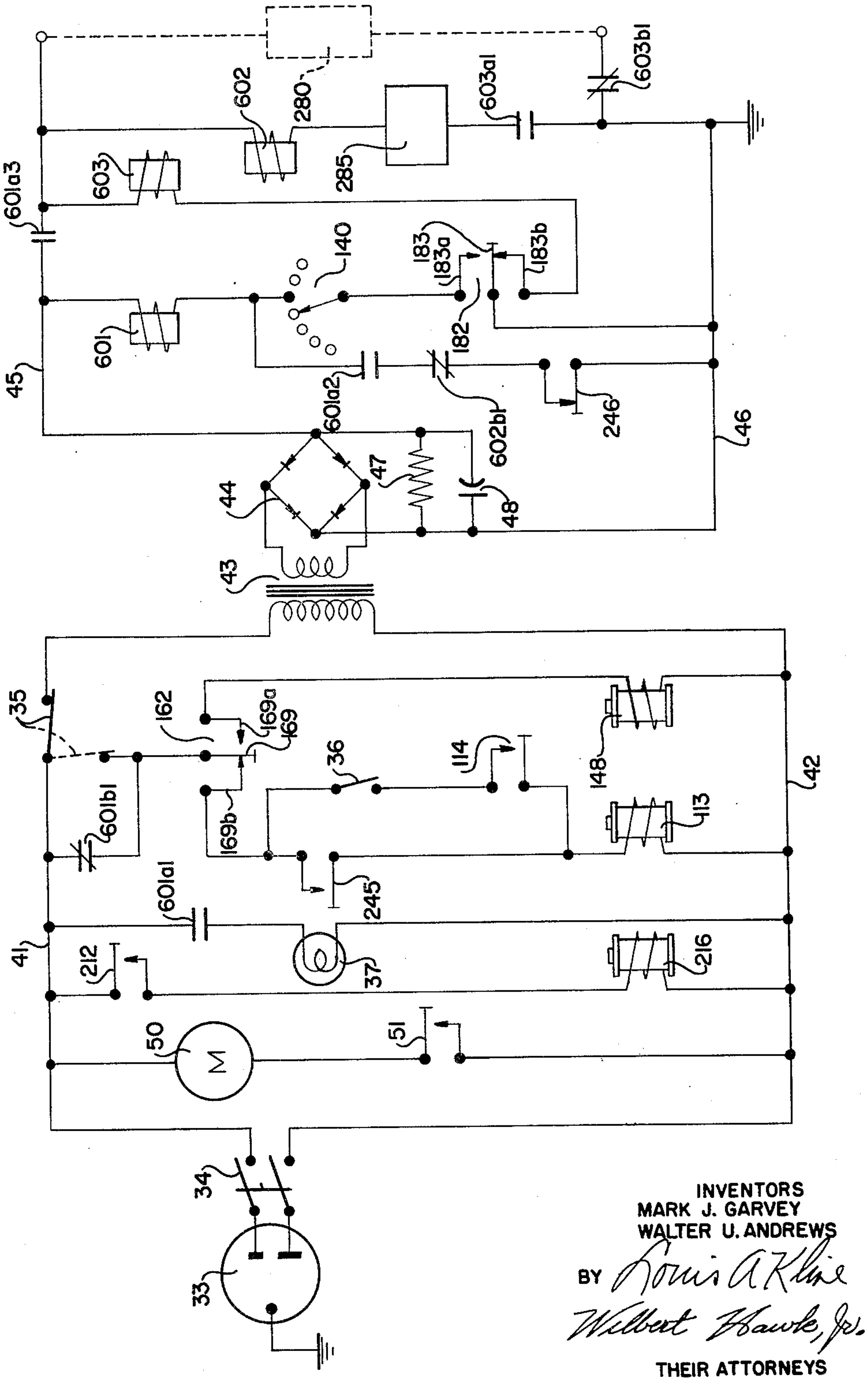

FIG. 8, on the sheet containing FIG. 2A and being also shown in part therein, is a detail showing the left side of control means associated with the machine trip and blocking mechanisms;

FIG. 9, on the sheet containing FIG. 3, is a view, in perspective, of the machine-carried mechanism, also shown in FIGS. 2A and 2B, effecting the start checking operation of the number-checking device;

FIG. 10 is a view, in perspective, of novel machine-carried mechanism, as also shown in FIG. 2B, for initiating machine cycling and performing a resetting operation when an entered account number is not approved by the number-checking device;

FIG. 11 is a view, in perspective, of additional machine-carried resetting mechanism associated with that shown in FIG. 10, such mechanism being also shown in FIG. 2B;

FIG. 12, on the sheet containing FIG. 10, is a detail showing the means by which a type of operation switch mechanism is actuated;

FIG. 13, on the sheet containing FIG. 1, is a detail of the means associated with each amount bank for setting a storage switch mechanism in accordance with the digit key depressed therein;

FIGS. 14 and 15, also on the sheet containing FIG. 1, illustrate portions of typical printed tapes issued, respectively, by traveling and fixed carriage type machines; and FIG. 16 is a schematic wiring diagram of the circuitry employed in the invention.

GENERAL DESCRIPTION

As above mentioned, the basic calculating machine herein illustrated and described is of the general type disclosed in United States Letters Patent to Nelson R. Frieberg and Oscar F. Larsen, No. 2,692,726. Referring to FIG. 1 herein, the mechanism of the machine is enclosed in a suitable cabinet or case 20 secured to a machine base which supports the framework of the machine. The machine is provided with a totalizer mechanism and may have, as seen in FIG. 1, associated indicator mechanisms 21, which are visible through a viewing aperture 22 provided in the casing 20. A paper carriage 23 extends across the rear of the machine to present the usual platen 24 and listing tape 25 for receiving printed impressions of item amounts and other digits entered into the machine.

Although FIG. 1 illustrates a movable carriage of the type disclosed in the above-mentioned Frieberg and Larsen patent, which carriage may be conditioned through selectively-settable stop members to cross-tabulate from a starting column printing position to other horizontally-aligned column printing positions and then be returned to the starting column for additional lines of such printing, it is conceivable that other carriage mechanisms may be employed in carrying out the objects of the present invention. Referring to FIGS. 1 and 14, it is seen that the preferred embodiment of the invention provides cross-tabulation of the carriage mechanism for presenting a printed line across the tape 25 having two columns of printed matter, the first column containing the account number entered into the checking device and the second column containing the item amount associated with an account number approved by the checking device. In such embodiment, the account number is entered into the electrical storage means and recorded on the tape during a first cycle of the calculating machine, at the end of which cycle the carriage automatically tabulates to the second columnar position. Then, after a period of time required for the checking device to determine whether the entered number conforms or does not conform with the predetermined rule, during which time the calculating machine is inoperable, the item amount associated with an approved number may be entered into the totalizer mechanism and printed at the second columnar position during a second cycle of the calculating machine, at the end of which cycle the carriage is automatically returned to its first columnar position, with the listing tape spaced up for receiving new account numbers and printing further lines of data. The mechanism for returning the carriage to its first columnar position at the end of the second cycle of the machine, along with mechanism for spacing up the tape during such return movement, is clearly set forth in the above-mentioned patent to Frieberg and Larsen.

With such a mode of operation, the entering of the account number into the storage means of the machine is under a non-add type of machine operation. That is, the individual digits are not entered into the machine totalizer mechanism. Conversely, the digits making up the item amount are entered into the machine totalizer mechanism under an add type of machine operation, this being the second cycle of the machine, with the printing operation performed at the second columnar station or position. In accordance with the disclosure contained in the Frieberg and Larsen patent, such spaced-apart printing stations or positions, as well as the specific type of machine operation to be performed at each station, may be provided by selective stop members and the positioning of those members one from the other along the usual control bar. In this instance, a non-add type of stop member would determine the first columnar location and also control the type of machine operation performed during the first machine cycle. In like manner, an add type of stop member would locate the second column a tabulated distance therefrom and control the type of machine operation performed during the second cycle of machine operation. It is therefore seen that such stop members and their positioning along the control bar not only determine the column locations for printing on the listing tape 25, but also control the type of operation performed during the machine cycling at each column. Since detailed illustration and discussion of this mechanism are adequately set out in the reference Patent No. 2,692,726, specific illustration and further disclosure herein are deemed not necessary.

Attention is also directed to co-pending United States Patent application Serial No. 614,005, filed October 4, 1956, by Roland G. Fowler et al., now United States Patent No. 2,985,364, issued May 23, 1961. In this patent, to which reference is made, there are disclosed a plurality of multiple-point switches, some of which are set in accordance with and control the type of machine operation to be performed, while others, being in the form of digit storage mechanisms, are selectively positioned during such machine operation according to the value of the depressed digit keys. This patent also discloses tape-recording means for preparing, in addition to the printed record, punched tapes which may be used as future input means for the above-mentioned automatic accounting and data-processing machines. Although detailed illustration and description of the specific switch devices along with means for setting and resetting them are included in this Patent No. 2,985,364, enough of the basic mechanism thereof will be illustrated and described herein to give an understanding of the operation thereof in accordance with the present invention. In like manner, reference is also made to co-pending application for United States Letters Patent of Roland G. Fowler et al., Serial No. 854,066, filed November 19, 1959, and entitled "Multiple-Point Switch." This reference, a divisional application of Patent No. 2,985,364, discloses the specific structure and mode of operation of each of the above-mentioned switch mechanisms.

Although the illustrated embodiment of the invention herein includes a calculating machine having the basic structure disclosed in Patent No. 2,692,726, a machine of the general type disclosed in United States Letters Patent No. 2,813,611, issued to Nelson R. Frieberg and Oscar F. Larsen on November 19, 1957, may also be adapted for the number-checking device. The machine disclosed therein, like those in the other references above referred to, includes a cross-tabulating carriage for providing columnar printing under control of stop members selectively positioned along the control bar.

In addition to this type of carriage structure having selectively-positionable stop members for determining the number and location of printing columns across the listing tape 25, additional cross-tabulating carriage structures may be employed with equal success. Reference is therefore made to the following United States Letters Patent, which illustrate and disclose "shuttle" type carriage constructions: Patent No. 2,616,548, issued to Percival J. Townsend on November 4, 1952, and Patent No. 2,746,-304, issued to Emil P. Kuhlmann on May 22, 1956. These references show, by way of example, structural means for alternately shifting a record material carriage from the first columnar position to a second columnar position with platen line-spacing as the carriage returns to the first columnar position after the machine operation has been effected in respect to the second columnar position.

Referring to FIG. 15, there is illustrated a portion of a listing tape 25*a* having the representative account numbers and item amounts recorded seriatim to present a single column of printed matter. In this instance, rather than having the item amount associated with an approved account number printed at a separate columnar position along the same line of printing during the second cycle of the machine, the item amount is printed a spaced distance thereunder and in the same column during such second machine cycle. United States Letters Patent No. 2,745,601, issued to Roland G. Fowler et al. on May 15, 1956, is also herein referred to as disclosing a machine of the general type which may be included within the subject matter of the present invention. Such a machine includes a non-shiftable type of carriage, commonly referred to in the art as a "fixed" carriage, wherein the paper tape is line-spaced after each machine operation to accommodate the recording of the next entry made into the machine. Since there are no stop members or other type of operation-conditioning means associated with such a machine, appropriate transaction or control keys are provided for cycling the machine under a manually-selected type of operation. With this general type of machine adapted for account number checking, it is apparent that each account number would be entered under a machine cycle initiated by the depression of a non-add control key, and, if that entered number is approved by the checking device, a second machine cycle would be permitted for entering the item amount associated therewith. In accordance with the disclosure contained in the Fowler et al. Patent No. 2,745,601, the initiation of the second machine cycle may be brought about through depression of the usual add control key, or what is commonly called the add motor bar, or may, through the key-responsive cycling means disclosed therein, be brought about by additional pressure being applied to the last digit key depressed. Such key-responsive cycling means, normally included within and associated with the term "Live Keyboard," may also be applied to the Frieberg and Larsen reference United States Patent No. 2,692,726, and to the Fowler et al. United States Patent No. 2,985,-364, for initiating machine cycling in both the first and the second columnar positions, thereby eliminating the additional step of having to depress the add motor bar after the digit amount has been set up on the machine keyboard in each instance. With the employment of a machine of this general type having a fixed carriage, each uncheckable account number entered into the number-checking device and recorded on the listing tape would have a blank space thereunder rather than to the side thereof, as would be the case with a movable or shiftable carriage, also indicating that the preceding account or identification number is erroneous, since the recording of the item amount associated therewith has been prevented.

Looking further to FIG. 1, the basic machine is provided with a plurality of rows of digit keys 26, each row containing nine keys to represent the digits "1" to "9" inclusive; a cyclically-operable machine drive mechanism (FIGS. 2A and 2B) having a single-cycle operation for data entry and a double-cycle operation for data reading or withdrawal; an add motor bar or control key 27, for initiating a cycle of operation in which data set up on the digit keys is entered into the electrical storage means or additively into the totalizer mechanism, depending upon machine type of operation conditioning; a subtract control key 28, for initiating a cycle of operation in which the data set up on the digit keys is entered subtractively into the totalizer mechanism; a correction key 29, for returning depressed digit keys 26 to an unoperated condition before the initiation of a machine cycle; a subtotal control key 30, depression of which initiates a two-cycle operation in which the data accumulated in the totalizer mechanism is printed on the tape; and a total control key 31, depression of which initiates a two-cycle operation in which the data accumulated in the totalizer mechanism is cleared therefrom and printed on the tape. A non-add control key 32 may be also included in such basic machine structure for initiating a cycle of operation in which data set up on the digit keys is printed on the tape 25 or 25*a* but not entered into the totalizer mechanism, such key 32 being illustrated herein for reference to machines having the "fixed" and "shuttle" types of carriages wherein the first machine cycle is initiated by operation of said key for entering the account number into the electrical storage means only and printing that amount on the listing tape. From the above description, it is seen that traveling carriages of the type employing type of operation stop members eliminate the need for such a non-add key.

Added to the basic machine are manually-operable switches 34, 35, and 36, shown in FIG. 1 as located in the front and left side portions of the machine casing 20. The switch 34 provides means for selectively switching the calculating machine to either an "on" or an "off" condition by controlling electric power thereto from a main A.C. power supply, such supply being designated by the numeral 33 in FIG. 16. The switch 35, being a key-operated type of switch and located adjacent the switch 34 in the front portion of the machine casing 20, provides a like means for selectively switching the number-checking device 38 to either an "on" or an "off" condition. The switch 36, located along the side of the machine casing 20, is provided to break the electric circuit which supplies electric power to the key-responsive cycling means if so provided in the machine employed in the invention, thus preventing initiation of a machine cycle from the digit keys, as above mentioned with reference to United States Patent No. 2,745,601. Thus, as will be described later in detail with reference to the schematic wiring diagram, FIG. 16, the calculating machine may be operated alone or in combination with the number-checking device and may be also conditioned to permit cycling thereof to be initiated by the key-responsive means and/or the specific control keys provided.

As above set out, the number-checking device 38 is an independent unit electrically connected to the calculating machine, as illustrated in FIG. 1, by means of a cable member 39 extending therebetween, and, in accordance with the disclosures contained in the above-mentioned reference applications, United States patent applications Serial No. 699,984 and Serial No. 773,761, the number-checking device 38 includes structure containing a sensing relay member, herein designated by the numeral 602 and referred to respectively therein as relay "RY" and relay "RYC." Through electrical circuitry as specifically set out in each of the co-pending applications, such relay 602 (representing relays RY and RYC) becomes energized at the end of each checking operation which contains an account or identification number conforming to the number checker's predetermined rule or prescription. In like manner, such relay 602 remains unenergized if the entered number does not conform to the rule or prescription. Since the specific circuitry, electrical elements, and precise mode of operation of such a number-checking device are admirably set out in each of the reference applications incorporated herein, further detailed discussion thereof will be omitted from this specification.

Over and above those specific disclosures contained in the reference applications, wherein the energization of the relay 602 at the end of a checking operation permits continued operation of the calculating machine for receiving therein the item amount associated with an approved number, and deenergization thereof prevents further machine operation, additional relays are disclosed herein as being associated with the relay 602 and with the checking device 38. These relays, referred to as control relay 601 and reset relay 603, and their operation will be described more in detail with reference to the schematic wiring diagram, FIG. 16, along with a detailed operation of the invention. At this point of the description, it is sufficient to say that such relays 601, 602, 603 effect specific electrical contacts for completing, holding, and breaking circuits to both the number-checking device and the calculating machine.

Also, in accordance with the disclosures contained in the reference applications, a warning signal may be provided within the circuitry for calling attention to each account number entry not approved by the checking device. Within the embodiment of the present invention, a lamp 37 (FIG. 1) is illustrated as extending through the lower front portion of the machine cabinet 20 as a means for indicating such a non-approval and the "locked" condition of the calculating machine.

Looking further to FIG. 1, an additional control key is added to the basic machine. This key, designated by the numeral 40 and referred to herein as a reset key, provides novel means for initiating a special machine operation whenever an entered account or identification number does not conform to the checking device rule and additional machine cycling is thereby not permitted through the normal cycle-initiating means referred to above. As will be described in detail in relation to specific structure throughout the specification, the depression of the reset key 40 initiates a two-cycle machine operation for resetting any affected checking device controls while conditioning the calculating machine to receive a corrected account number entry therein.

From the above discussion of the invention, it is seen that one particular embodiment thereof provides for a calculating machine having the basic cycling and control mechanisms, the digit storage and type of operation control switch mechanisms, and the novel reset mechanism for initiating a special two-cycle operation when an entered account number does not conform to the number-checking device's rule or prescription. In addition, unique electrical circuitry is provided for timing the sequence of operation between the two units employed, thus presenting interlocking means therebetween, and also presenting means blocking further cycling of the calculating machine when an account or identification number entered under a first cycle thereof is not approved by the checking device.

*Calculating Machine and Checking Device Power Supply*

Referring to FIGS. 1 and 16, upon the manual closing of the double-pole switch 34, power is available from the supply 33 for completing circuits through alternating current lines 41 and 42. The key-operated switch 35 is provided in the current line 41 as a means for including or not including the number-checking device 38 within the power supplied by the A.C. source 33. Thus in FIG. 16 it is seen that the calculating machine is conditioned for electrical operation by closing of the switch 34. In like manner, the checking device may also be conditioned for electrical operation by closing of the switch 35, thereby being included in the power supplied to the calculating machine.

Upon the closing of both switches 34 and 35, a circuit is completed through a transformer 43, the output thereof being connected to a bridge rectifier 44 for supplying a source of D.C. power. One side of the rectifier 44 is connected to a direct current supply line 45, and the other side of the rectifier 44 is connected to a return line 46. A capacitor 48 is connected between the D.C. supply line 45 and the return line 46 in the usual manner for filtering out and blocking the flow of undesired pulsations or charges by storing them therein, thus allowing the passage of only the type of current desired. A bleeder, in the form of a resistor 47, is also connected across the lines 45 and 46 as means for regulating the voltage output from the rectifier 44 and also for discharging the capacitor 48 when the main power supply is removed from the circuit.

*Machine Drive and Cycle-Initiating Mechanism*

Figures 4, 5, 6:
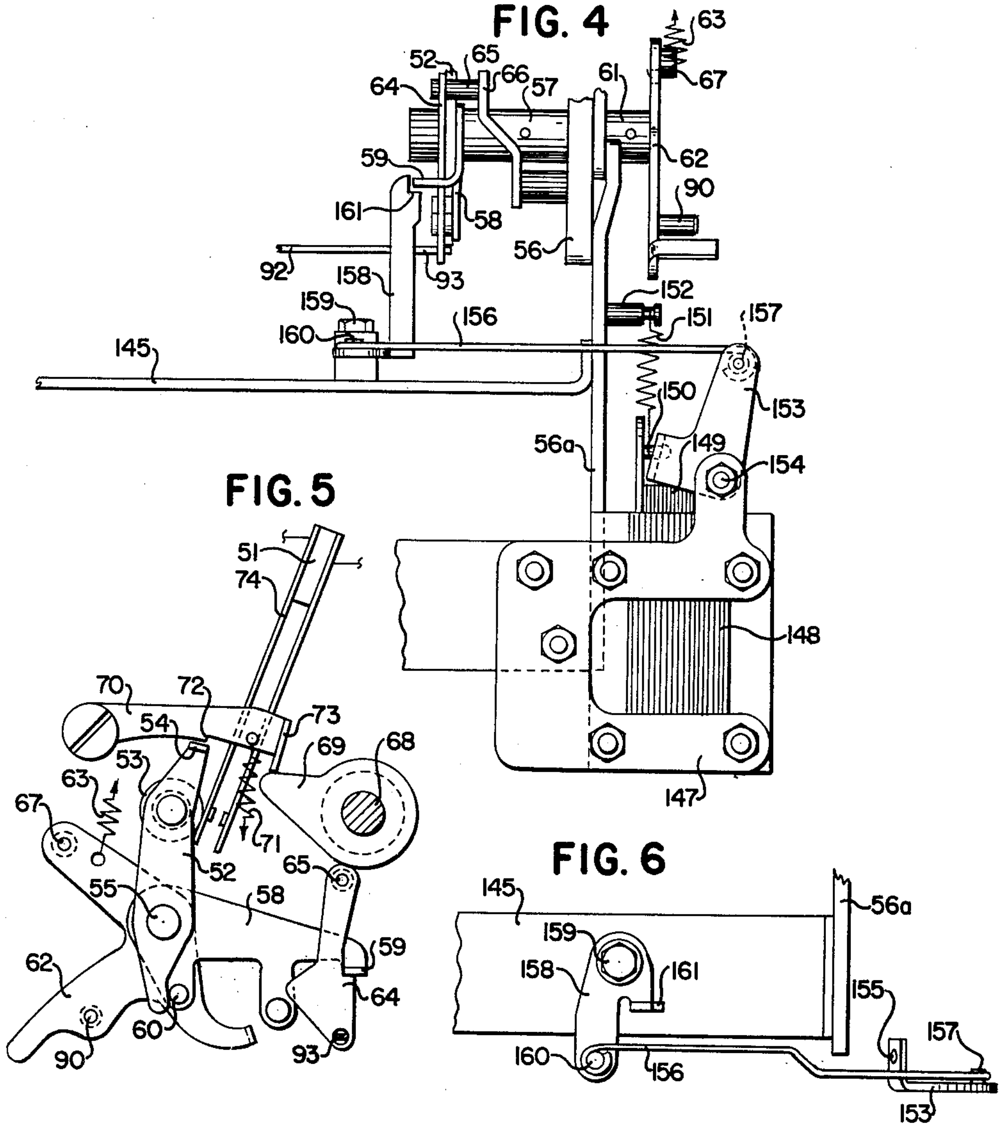
FIG. 4 is a view, in rear elevation, of the machine trip mechanism and the blocking means for preventing the machine from cycling while the associated number-checking device is in operation and when a digit amount entered therein is not approved by the device.
FIG. 5 is a right side elevation of the machine trip mechanism.
FIG. 6 is a detail, in top plan, of the machine-cycle-blocking means shown in FIG. 4.

Referring to FIGS. 2A, 4, and 5, the calculating machine is driven by an electric motor 50 upon the closing of a switch 51, which connects the motor to the source of electric current 33 (FIG. 16). The switch 51 is closed by a roller 53 on a lever 52, said lever 52 being rotatably mounted on a shaft 55 journaled in the machine left vertical frame plate 56, as seen in FIG. 4. Pinned to the shaft 55, on the inside of the frame plate 56, is a hub 57, fixedly secured to a multiple-armed lever 58, and pinned to the outer end of the shaft 55 is a second hub 61, which is secured to a three-armed cycle control lever 62. These levers 58 and 62 are constantly urged clockwise by a spring 63, shown in FIG. 5 and also in FIGS. 2A and 4, but are normally restrained from so moving by a trip latch 64. As seen in FIG. 4, this trip latch 64 is pivotally mounted on a stud 65, which extends from a bracket 66, secured to the frame plate 56. If the trip latch 64 is swung clockwise about its pivot stud 65, as seen in FIG. 5, by means to be described later herein, a distance sufficient to remove it from under a latch ear 59 carried by the lever 58, both levers 58 and 62 will likewise be turned clockwise under force of the spring 63. During such clockwise movement, a stud 60, mounted on a lower extending arm of the lever 58, will strike the lower end portion of the lever 52 to turn it also clockwise, thus causing the roller 53 thereon to contact and close the switch 51, which completes the circuit (FIG. 16) for starting the motor 50.

As will be described shortly, the operation of the motor 50 causes a rear drive shaft 68 to oscillate first counter-clockwise and then clockwise to the home position, as seen in FIG. 5, and the reverse directions, as seen in FIG. 2A. A cam lever 69, secured to the drive shaft 68, normally holds a detent 70 away from an ear 54 carried by the upper end of the lever 52, toward which it is urged by means of a spring 71, but, as the cam lever 69 turns counter-clockwise upon the rocking of the drive shaft 68 (FIG. 5), a lower shoulder 72 of the detent 70 will fall behind the ear 54 as the lever 52 is moved clockwise, holding the switch 51 in a closed condition. Then the cam lever 69, on return movement at the end of the cycle, will strike a rear end 73 of the detent 70, thereby lifting the detent 70 upwardly, away from the ear 54, to again open the switch 51 at the end of the machine cycle.

The motor 50, through reduction gearing not shown herein, drives a horizontal shaft 75 counter-clockwise (FIG. 2A). Secured to the shaft 75, behind a plate 76, is a notched gear or wheel, which is adapted to be engaged by the end of a pawl 77, pivoted to a drive or crank plate 78, which is rotatably mounted on the shaft 75. The pawl 77 is normally urged counter-clockwise into engaging position with the notched wheel on the shaft 75 by a spring 79, but, when the cycle control lever 62 is in home position, a stud 67 thereon bears against an end portion of the pawl 77, as seen in FIG. 9, to hold it from such engagement with the notched wheel. Then, as above mentioned with reference to FIG. 5, if the trip latch 64 is rocked clockwise, permitting the levers 58 and 62 to be also rocked clockwise, the stud 67 on the lever 62 will be moved away from the pawl 77 and allow the pawl to engage the notched wheel on the shaft 75. Thus, it is evident that, as the motor 50 is started, the pawl 77 is engaged with the notched wheel on the shaft 75, and, due to its being mounted on the crank plate 78, the crank plate 78 commences to move counter-clockwise, as seen in FIG. 2A. A drive link 80 is pivoted at one end to the crank plate 78 by means of a pivot stud 81 thereon. The other end of the link 80 is pivoted to a bell crank lever 82, which is rotatably mounted on the rear drive shaft 68. Also pivoted to the drive link 80, by means of a stud 83, is a lever 85, having, mounted near its outer end, a roller stud 86, which cooperates with a notch in a drive plate 87, secured to the shaft 68. The stud 86 is normally urged into engagement with the notch by a spring 88, extending between the outer end of the lever 85 and a downwardly-extending arm of the bell crank lever 82. This spring 88 is strong enough to hold the roller stud 86 in the notch to form a driving connection between the bell crank lever 82 and the shaft 68 during all normal operations of the machine, but such connection will yield to any overload placed on the main drive shaft 68. Under such circumstances, as will be described later herein, a machine cycle commonly referred to as a "short stroke" takes place, permitting the complete rotation of the motor-driven shaft 75 even though the normal oscillation of the shaft 68 is prevented for one reason or another.

As the crank plate 78 nears the end of its rotation, a cam portion 89 thereof strikes a roller 90, carried by the downwardly- and forwardly-extending arm of the cycle control lever 62, rocking said lever 62 clockwise, as seen in FIG. 2A, and counter-clockwise, as seen in FIG. 5. Referring further to FIG. 5, as the lever 62 is rocked counter-clockwise, it carries the lever 58 with it, allowing the trip latch 64 to swing under the ear 59 thereof and hold it in home position. In this position, the motor switch 51 is open, since the cam lever 69 shifts the detent 70 from holding engagement with the lever 52, thereby permitting a leaf 74 of the switch 51 to rock the lever 52 counter-clockwise under the detent 70.

Figure 7:
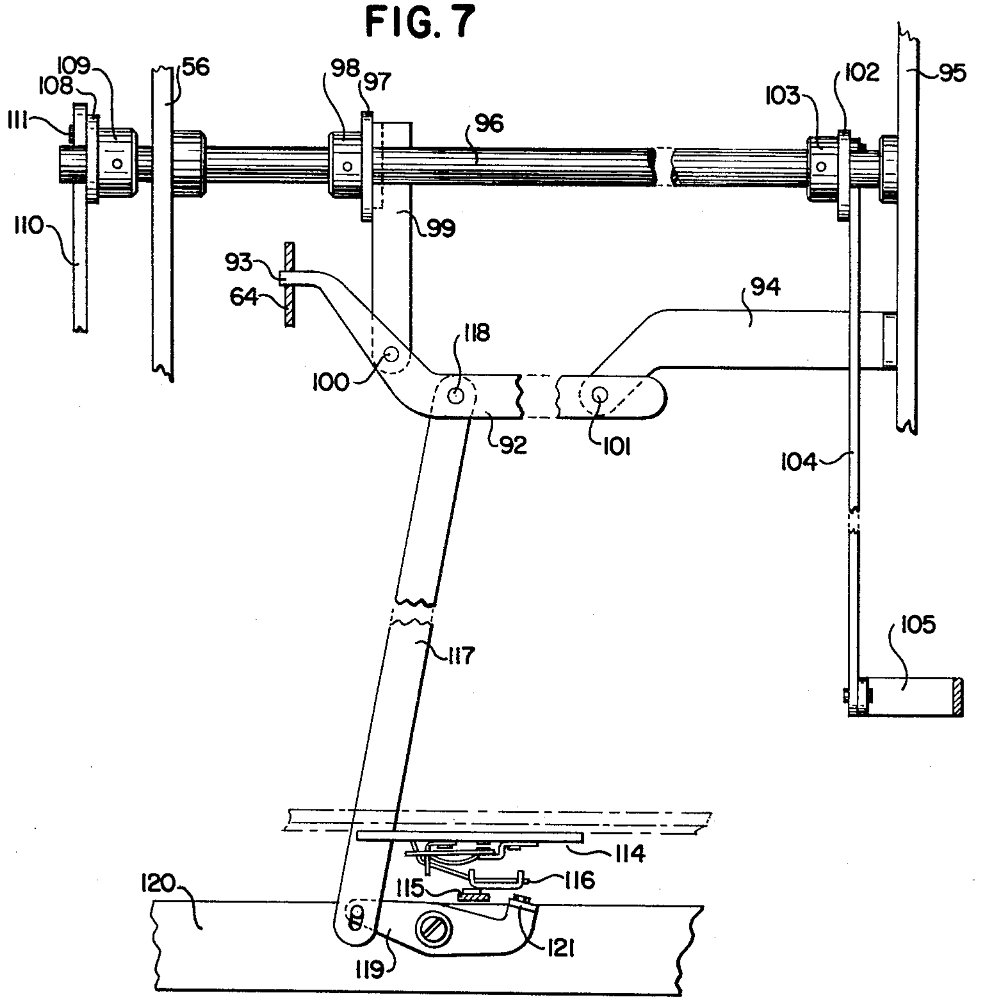
FIG. 7 is a plan view, looking down on the base of the machine, showing part of the cycle-initiating means and including a switching means for key-responsive cycling mechanism.

The trip latch 64 is moved to machine-tripping position by an outer free end portion 93 of a trip lever 92 pivoted at its other end to a bracket 94 secured to the right vertical frame plate 95 of the machine (FIGS. 4 and 7). The actual tripping of a calculating machine embodying the present invention may be effected by various means; that is, the swinging of the trip latch 64 from under the ear 59 of the three-armed lever 58, as above described. Looking at FIGS. 3 and 7, and referring to the above-mentioned Frieberg and Larsen Patent No. 2,692,726, it is seen that the machine may be effectively tripped upon the depression of the add motor bar 27 through the following mechanism. Referring especially to FIG. 7, a trip shaft 96 is journaled in the vertical frame plates 56 and 95 to extend across the rear of the machine. An arm 97 is secured to the shaft 96 by means of a hub 98, intermediate the frames 56 and 95, and pivotally engages one end of a forwardly-extending link 99. The other end of the link 99 pivotally engages the lever 92 adjacent its free end 93 by means of a stud 100. With such construction, it is seen that, upon the counter-clockwise rocking of the shaft 96 (FIG. 2A), the link 99 will be shifted forwardly (FIG. 7) to swing the trip lever 92 counter-clockwise about its pivot 101, thus pulling the trip latch 64 out of engagement with the ear 59 of the lever 58. A second arm 102, secured to the shaft 96 adjacent the right vertical frame plate 95 by means of a hub 103, is coupled to the machine control keys 27, 28, 30, 31, and 32 by a link 104, extending therefrom toward the front of the machine, the forward end of which link is pivoted to the lower extending arm of the machine main trip lever 105, pivoted to the right vertical frame plate 95 at pivot 106. The forwardly-extending arm of the four-armed trip lever 105 has an ear 105*a*, which is held against the right frame plate 95 by a spring 107, thus urging the link 104 constantly rearwardly. In this position, under the tension of a spring 107, the shaft 96 is in a non-tripping position and maintains the trip latch 64 under the ear 59 of the lever 58. In the manner set out in detail in the above-mentioned Frieberg and Larsen patent, upon the depression of a control key, such as the add motor bar 27, the machine trip lever 105 is rocked clockwise (FIG. 3) about the pivot 106 to overcome the tension of the spring 107, pulling the link 104 forwardly and, through its interconnected arm 102, rocking the trip shaft 96 counter-clockwise, as seen in FIG. 2A. Upon such counter-clockwise rocking of the shaft 96, the trip latch 64, which is normally urged in a latched position under tension of the spring 107, is swung to an unlatching position by means of the link 99 interconnecting the shaft 96 with the trip lever 92, as above mentioned. Then, after the machine cycles and the cam lever 69 removes the detent 70 from engagement with the lever 52, the trip latch 64 is again urged to a latching position through a reverse rocking of the shaft 96 under tension of the trip lever spring 107. In addition to such manual tripping of the machine under depression of the control keys provided thereon, the latch 64 may also be swung to a tripping position by means of electrically-controlled mechanism now to be described.

A third arm, 108, is secured to the trip shaft 96 by means of a hub 109, this arm 108 being located on the outside of the left vertical frame plate 56, as seen in FIGS. 2A and 7. Referring especially to FIG. 2A, a link 110 is pivotally interconnected by one end to the arm 108 by means of a stud 111, this link 110 extending forwardly therefrom and fixedly interconnecting a shiftable plunger member 112 of a trip solenoid 113. Upon the energization of the trip solenoid 113, the link 110 is pulled forwardly of the machine, rocking the trip shaft 96 counter-clockwise to likewise shift the trip latch 64 to an unlatching position in relation to the three-armed lever 58. The specific circuitry for the energization of this solenoid 113 and thus for the rocking of the trip shaft 96 as above mentioned will be described in detail herein in relation to FIG. 16.

From the above description, it is seen that the trip latch 64 is rocked clockwise (FIG. 5) to start the machine cycling, such rocking being effected by the free end 93 of the trip lever 92. Thus, the trip lever 92 is rocked counter-clockwise, as seen in FIG. 7, to initiate a machine cycle, and such rocking is done by rocking of the trip shaft 96 under control of the trip solenoid 113 or by the link 104 being pulled forwardly by the control keys, such as the add motor bar 27, as above described. Referring to FIGS. 1 and 16, the energization of the trip solenoid 113 may also be effected through a circuit including the switch 36, which may be closed to condition for operation the digit-key-actuated machine-cycle-initiating mechanism, including a digit-key-controlled switch 114 common to all of the digit keys 26. This switch 114, as seen in FIG. 7, is normally held open by the depending tail 115 of a denominational key row slide actuating bail, as set out in detail in United States reference Patent No. 2,745,601, to Roland G. Fowler et al. Such tail 115 holds in a lever 116 when the bail, not shown herein, is in normal position due to no digit keys' being depressed. As a digit key 26 is depressed, the tail 115 moves forward, releasing the lever 116 and allowing the switch 114 to close, completing the trip solenoid 113 energizing circuit (FIG. 16) and initiating a machine cycle by rocking the trip lever 92 counter-clockwise under control of the rocking of the trip shaft 96. As the trip solenoid 113 is energized, rocking the trip lever 92 counter-clockwise, as seen in FIG. 7, a link 117, pivoted intermediate the pivot studs 100 and 101 by a stud 118, is moved forward and rocks counter-clockwise a lever 119, pivoted to a front end portion 120 of the machine base. During such counter-clockwise rocking of the lever 119, an ear 121 thereof presses against the lever 116, opening the switch 114 and deenergizing the trip solenoid 113. The switch 114 stays open until the trip latch 64 is restored at the end of the machine cycle, whereupon the trip lever 92, the link 117, pivotally connected thereto, the lever 119, and the digit keys 26 have been restored, so that the tail 115 continues holding the switch 114 open to prevent an unwanted re-cycling of the machine. When the machine is cycled by means of control keys provided, the switch lever 119 is rocked because the trip lever 92 is rocked upon rotation of the trip shaft 96, but, as the switch 114 is already held in an open condition by the tail 115, such rocking is useless and of no effect for energizing the trip solenoid 113 in this instance. Thus, it is seen that the trip latch 64 is rocked to a tripping position upon the rocking of the trip shaft 96 as the spring 107 (FIG. 3) is overcome, and, as above described, this rocking of the trip shaft 96 is had upon the depression of one of the control keys provided, by the energization of the trip solenoid 113 under control of such digit-key-responsive means, or by additional means, as will be described later herein in reference to FIG. 16 under a machine resetting operation.

*Digit Storage Switches and Setting Mechanism*

Referring to FIG. 13, extending from an ear 127 on a downwardly-extending arm 126 of each amount bank diverging lever 125 provided in the machine is a bracket 128, fixedly carrying a downwardly-extending pin 129. At this point, it may be stated that each diverging lever 125 is rotatably mounted on a cross shaft 124, extending between the frame plates 56 and 95 of the machine, such shaft 124 being also shown in FIG. 2A. In accordance with the disclosure set out in the Fowler et al. United States patent application Serial No. 614,005, the present invention employs ten such diverging levers 125, there being one associated with each row of digit keys 26. As also set out therein, the amount of movement of each diverging lever 125 is controlled by the digit key depressed in the row of keys 26 associated therewith. Thus, looking at FIG. 13, during the cycling of the machine, each diverging lever 125 provided is rotated counter-clockwise an amount determined by a depressed key 26. During such movement of each lever 125, its pin 129 is shifted along a guide and actuating member 130 to be presented above a plunger 132 of a storage switch mechanism 131, such plunger 132 corresponding to the digit key depressed. These switch plungers 132 represent the digits 0 to 9 and are individually selected in accordance with the amount of rocking of the diverging lever 125, which in turn is controlled by the digit keys 26 associated therewith.

The guide and actuating member 130 is normally held in a non-actuating, or upper, position, as shown in FIG. 13, by means of a forked arm 133, pinned to a cross shaft 134 and urged clockwise by means of spring tensioning, not shown herein. As set out in detail in the reference patent application of Roland G. Fowler et al., upon the oscillation of the rear drive shaft 68 first counter-clockwise and then returned clockwise during the second half of the machine cycle, the forked arm 133 is rocked counter-clockwise during the middle of the machine cycle, pulling the guide and actuating member 130 downwardly to depress the switch plunger 132 selected prior to that time in the cycle, and returning the forked arm 133 clockwise shortly after mid-cycle of the machine to present the member 130 in its upper, non-actuating, position. Thus the guide and actuating member 130 (FIG. 13), through oscillation of the rear drive shaft 68 (FIG. 5), is moved near the end of the first half-cycle of the machine in a downward and switch-actuating direction and returns to home position, as seen in FIG. 13, at the very beginning of the second half-cycle of the machine operation. During such movement of the member 130, the pins or plunger-selecting members 129 of the various amount banks actuate the switches 131 in their various denominational orders as directed by the depressed digit keys 26. As above stated, and as set out in the reference application, there is a series of these storage switches 131, one such switch for each amount denominational order arranged in alignment with the pin 129 of the associated diverging lever 125.

The restoration of each storage switch member 131 is performed at the very beginning of each entry cycle by means of a rocker arm 136 being actuated against the bottom edge of each switch to restore to the upper position any plunger 132 which has been depressed in a preceding machine operation. As seen in FIG. 13, each rocker arm 136 is mounted on a restoring shaft 135, which likewise is actuated by the rear drive shaft 68 in a manner set out in the reference application. It is thus understood that the storage switches 131 are set according to the depressed digit keys 26 in a given operation about the middle of the machine cycle, and are restored to normal position at the beginning of the next machine cycle.

*Type of Operation Switch Mechanism*

In a manner set out above in reference to the digit storage switch mechanisms 131, a type of operation switch unit 140, having plungers 141, is set in accordance with the type of operation performed by the machine in each instance. A selecting arm 142 (FIG. 12) is rotatably mounted on the shaft 124 along with the diverging levers 125 to present a selecting pin 143 in alignment with the switch mechanism 140. This pin 143 is shiftably carried within a guide and actuating member 144, which, like the member 130, is moved downwardly to depress the plunger 141 selected near the mid-cycle of a machine operation and is moved upwardly at the very beginning of the second half-cycle of the machine operation. Again, as above set out in reference to the digit storage switch mechanisms, the switch mechanism 140 is reset by the rocker arm 136 at the beginning of the next machine operation, which in this instance is normally the second machine cycle for entering the item amount associated with a checkable account number. In this particular embodiment of the invention, and in accordance with the conditioning of the calculating machine for non-add type of operation, the selecting arm 142, with its pin 143, is rocked about the shaft 124 to select and depress a particular plunger 141 of the switch unit 140 for completing an electric circuit to the number-checking device 38 and calling that device into operation for interrogating the digits contained in the storage switch units 131. Although numerous plungers 141 are provided (FIG. 12), the non-add plunger only is incorporated into the present invention and is designated as plunger 7 in this instance, being the third plunger from the right-hand end of the unit 140, for completing the electric circuit to the checking device 38. This non-add plunger 141 is selected for depression during each account-number-entering cycle of the machine by means determining the amount of rocking of the selecting arm 142, such means including mechanisms interconnecting the selecting arm 142 with the above-mentioned non-add type of operation stop member as well as with the non-add control key 32 provided on the machine. In the preferred embodiment of the invention, including the cross-tabulating type of machine carriage, the selected stop member carried by its control bar conditions the movement of the selecting arm 142 to present its pin 143 above the non-add plunger 141, whereas, under operation of the "shuttle" and "fixed carriage" type of machines, the depression of the non-add control key 32, to initiate the first machine cycle, conditions such movement of the selecting arm 142. With references made to each type of machine carriage and its specific operation, the precise mechanisms which control the type of machine operation to be performed, as well as the shifting of the selecting arm 142, need not be illustrated and described herein. The essential point is that, regardless of the means for determining the non-add type of machine operation, the non-add plunger 141 of the switch unit 140 is selected to complete a circuit to the number-checking device 38. During all other types of machine operations, including the second cycle thereof for entering into the totalizer mechanism the item amount associated with a checkable number, being an add type of machine operation, any plunger 141 on the switch unit 140 selected would not complete such a circuit to the device 38, since the specific terminals thereof are not wired into the electrical circuitry of the invention. Therefore, it is seen that, during the first machine cycle for entering the account number into the storage switches 131, such electric circuit is completed through the type of operation switch unit 140, whereas, during a second machine cycle for entering an item amount associated therewith, no circuit is completed through such switch unit 140, since the non-add plunger 141 would not be selected and depressed in that instance, and during such non-add type of machine operation, as set out above, the digit amount set up on the keys 26 would not be entered into the machine totalizer mechanism but would be entered only into the storage switches 131 and be printed on the tape 25 or 25*a*. In a like manner, under the add type of machine operation, being the second cycle thereof, the digit amount entered through the keys 26 would be included in the totalizer mechanism, would be printed on the tape 25 or 25*a*, and also would be entered into the storage switch mechanism 131 even though never interrogated or used by the checking device 38, since its calling-in circuit would not be completed under such a machine operation, wherein the non-add plunger 141 is not selected. Thus, even though each digit amount entered into the machine through the keys 26 is included in the storage switch mechanisms 131, only those amounts entered therein under a non-add type of machine operation are presented to the checking device 38 for determining the accuracy thereof. During each operation of the machine, the digit amount set up on the keys 26 is recorded on the listing tape in the usual manner; that is, by the shifting of type bars in accordance with the movement of the various diverging levers 125.

*Machine Cycle Blocking Mechanism*

To prevent the machine from entering into a cycle of operation while the number-checking device 38 is still performing the checking operation and also when such checking operation is completed but the account number entered therein does not conform to the predetermined rule or prescription, a blocking means is provided whereby, even though the operator trips the latch 64, the three-armed lever 58 will be allowed only a slight clockwise movement toward a tripping position, such movement being insufficient to close the motor switch 51. Referring to FIGS. 2A and 4, a blocking solenoid 148, having an upwardly-directed shiftable armature 149, is fixedly carried by a bracket 147, extending outwardly from the rearmost edge of a lower extension 56*a* of the left vertical frame plate 56. A control lever 153, pivotally mounted on an upper portion of the bracket 147 by a bolt 154, is provided with a forwardly-directed arm engaging the solenoid armature 149 through a stud 150 carried by the armature and loosely entering an aperture 155 therein (FIG. 6). Referring particularly to FIG. 4, it is seen that such construction provides for a counter-clockwise movement of the control lever 153 upon energization of the solenoid 148. In like manner, when the solenoid 148 is not energized, the control lever 153 is rocked to the position shown in FIG. 4 by means of a spring 151, extending between the armature-carried stud 150 and a second stud 152, carried by the frame plate 56*a* at a zone above the blocking solenoid 148. A link 156 is pivotally connected by one end to an upwardly-extending arm of the lever 153 at pivot stud 157, extending inwardly therefrom at a zone behind the frame plate extension 56*a*, to interconnect a blocking arm 158, which is rockably secured to a cross brace 145 by means of a bolt 159. The brace 145 extends across the rear of the machine between the left and right vertical frame plates thereof. This blocking arm 158 is substantially L-shaped, having a rearwardly-extending leg, carrying a stud 160 for receiving the link 156, and an upwardly-directed leg having a shoulder 161 provided therein. As seen in FIG. 4, the normal positioning of the blocking arm 158 is such that, when the solenoid 148 is not energized, its shoulder 161 will lie in alignment with and only a slight distance under the ear 59 of the three-armed lever 58, thereby preventing a clockwise rotation of the lever 58 sufficient to close the motor switch 51. Upon the energization of the blocking solenoid 148, the armature 149 is pulled downwardly, as seen in FIG. 4, thereby rocking control lever 153 counter-clockwise about its pivot 154, which in turn, through the link 156, rocks the blocking arm 158 clockwise (FIG. 6) to remove its shoulder 161 from under the ear 59 of the three-armed lever 58. The blocking arm 158 is normally held in its blocking position under the ear 59 by means of the spring 151 and may be removed therefrom only by the energization of the solenoid 148. Therefore, with such construction, along with the above-set-out machine-tripping mechanism, it is seen that the actual cycling of the machine is had only upon removal of both the trip latch 64 and the blocking arm 158 from under the ear 59 of the three-armed lever 58. Even though the trip latch 64 is removed therefrom by any one of the various tripping means above referred to, the shoulder 161 of the blocking arm 158 must likewise be removed therefrom before the machine may cycle.

As above described with reference to the number checking device United States patent applications Serial No. 699,984 and Serial No. 773,761, the sensing relay 602 (representing relays RY and RYC therein) is not energized during the period of time required for the checking operation. In like manner, this relay 602 is not energized if the digit amount entered therein and checked by the device does not conform to the predetermined rule or prescription, such relay 602 being energized only after each checking operation wherein an account number conforming to the rule has been entered. Also, in accordance with specific disclosure contained in those reference applications, such relay 602 may be used to control operation of the machine and indicator means and/or signals by holding open, and closed, respective sets of relay contacts interposed in machine-operating and signal circuits in any of numerous conventional or obvious modes. Under such disclosure, and in accordance with the specific embodiment of this invention, the additional relays 601 and 603 herein are provided as being operably associated with the sensing relay 602. The relay 601, referred to as a control relay, and as included in the circuitry in FIG. 16, becomes energized to effect various relay contacts associated therewith when the sensing relay 602 is not energized, and in a like manner becomes deenergized when the sensing relay 602 is in an energized condition. Looking at FIG. 16, when the relay 601 is energized, a normally-open relay contact 601*a*1 becomes closed to complete a circuit to the lamp 37, thus indicating the time that the checking operation is being performed, and, during such time that the checking operation is being performed, the calculating machine is inoperable, since a normally-closed relay contact 601*b*1 becomes opened by the energization of the relay 601, thus preventing a circuit from being completed to either the tripping solenoid 113 or the blocking solenoid 148. In this instance—that is, having the control relay 601 energized after the device 38 has completed its checking operation, it is seen (FIG. 16) that the calculating machine may not be cycled again until the energizing current is removed from the control relay 601, so that its contact 601*b*1 may again close to provide a path for completing circuits to such solenoids 113 and 148.

Referring to FIGS. 2A and 8, a transfer switch 162 is carried on the outer side of the machine left vertical frame plate 56 by means of a bracket 163. Rotatably mounted on a frame-carried bolt 171 is a rearwardly-extending lever 164 having an overturned ear 165 lying in the path of movement of the forwardly-extending leg of the three-armed lever 62, as best shown in FIG. 8. A spring 166, extending between the lever 164 and a frame-carried stud 167, normally urges the lever 164 clockwise, away from the switch 162, but, as seen in FIG. 8, in the home position of the machine, the three-armed lever 62 prevents such movement until the trip latch 64 is rocked to tripping position by any of the various means as above set out in the specification. In such home position of the machine, a roller 168, carried by the rear end of the lever 164, engages the common contact 169 of the switch 162 to provide a lower, normally-closed contact **169*b* and an upper, normally-open contact 169*a*. Referring to the above machine-tripping mechanism, upon the clockwise rotation of the three-armed lever 62, as seen in FIG. 5, and upon its counter-clockwise rotation, as seen in FIGS. 2A and 8, when the trip latch 64 is removed from under the ear 59 of the lever 58, the lever 164 is free to rock clockwise, under the force of the spring 166, to open the normally-closed contact 169*b* of the switch 162 and close its normally-open contact 169*a* as the roller 168 is removed from engagement with the common contact 169, which is now free to spring upwardly. Referring further to FIG. 16, it is seen that, with the employment of such transfer switch 162, the tripping solenoid 113 may be energized immediately upon the tripping of the latch 64, thereby permitting the slight clockwise movement of the three-armed lever 58, and that the blocking solenoid 148 may be energized shortly thereafter upon the transfer of the common contact 169, thus removing the blocking arm 153 from under the ear 59 of the lever 58 and permitting the motor switch 51** to be closed for starting a machine cycle.

*Number Checking Device Initiating Means*

Referring to FIGS. 2A, 2B, and 9, an inverted T-shaped plate member 170 is fixedly carried by the machine left vertical frame plate 56, herein shown as being positioned on the outer side thereof and along the lower edge portion thereof by means of the frame-engaging bolt 172 and a second bolt **172*a*. Rotatably mounted on a plate-carried bolt 171, adjacent the plate member 170 and on the outer side thereof, is an L-shaped arm 173, having its major leg extending upwardly and rearwardly from and its minor leg extending forwardly of the pivot bolt 171. A switch-actuating lever 176 is also rotatably mounted on the bolt 171, on the outer side of the arm 173, and extends forwardly therefrom a present a roller 177 a spaced distance under a common contact 183 of a switch 182, such switch 182 being secured to an ear 170*a* of the plate member 170. In the home position of the machine, as illustrated in FIGS. 2A and 2B, with the roller 177 positioned a distance below the common contact 183, the switch 182 is provided with a lower, normally-closed contact 183*b* and an upper, normally-open contact 183*a*. An upper ear 178 of the lever 176 normally abuts, compressively, the lower edge of the minor leg of the arm 173 by means of a spring 184. As best seen in FIG. 2A, this spring 184 extends from a stud 174, mounted on the minor leg of the arm 173, to engage a lower ear 179 of the lever 176, thus providing a yielding relationship between those members 173 and 176. A second spring 185, extending between the stud 174 and a lower ear 170*b* of the plate member 170, normally urges the arm 173 and the lever 176 clockwise to present an upper forward surface 175 of the arm 173 in the normal path of travel of the stud 81, the extent of such clockwise movement being limited by the stud 174 abutting an upper edge 170*d* of the plate member 170** (FIG. 9).

Rockably mounted on a pivot stud 186, carried by the upwardly-extending leg of the inverted T-shaped plate member 170, is a latch member 188, normally urged counter-clockwise by means of a spring 189, extending between a lower end portion thereof and an ear **170*c* of the plate member 170. This latch member 188 is substatially L-shaped, having its rearwardly-directed minor leg 190 retained in yielding abutment with the stud 81 of the crank or drive plate 78. As above mentioned with reference to FIG. 2A, as the drive plate 78 is rotated counter-clockwise during each machine cycle, the stud 81 thereon, upon contacting the forwardly directed surface 175 of the arm 173, will rock the arm 173 and its yieldingly interconnected lever 176 counter-clockwise an amount sufficient to cause the lever roller 177 to open the normally-closed contact 183*b* and close the normally-open contact 183*a* of the switch 182. Such transferring of the common contact 183 of the switch 182 calls into operation the number-checking device 38 in a manner to be described later herein in reference to FIG. 16. Although the surface 175 of the arm 173, lying in the path of movement of the stud 81, determines the total amount of counter-clockwise movement of the arm 173, the lever 176 is rocked only a distance sufficient to transfer the switch 182 in view of the spring 184, which will then yield to prevent excessive pressure from being applied to the switch common contact 183. As the stud 81 moves away from the minor leg 190 of the latch member 188 at the very beginning of a machine cycle, the spring 189 rocks the latch member 188 a slight distance counter-clockwise to present its forward edge 191 in compressive abutment with an inwardly-directed ear 180 of the lever 176. Referring to FIG. 9, wherein the mechanism is shown in more or less detail, upon the counter-clockwise movement of the lever 176 as above described for transferring the switch 182, its ear 180, after the normally-open contact 183*a* of the switch 182 has become closed and the yielding of the spring 184 begins, enters a notch 192 provided in the forward edge 191 of the latch member 188, thereby latching the switch 182 in its transferred condition. The structural arrangement of such notch 192 and switch 182 in relation to the lever 176 is such that the contact 183*b* becomes opened and the contact 183*a* becomes closed near the mid-cycle of a machine operation, upon the stud 81 contacting and rotating the arm 173 counter-clockwise, and remain latched in such transferred positions until near the end of the machine cycle, when the stud 81 contacts the minor leg 190 of the latch 188 to rock it clockwise a distance sufficient to release the lever 176, which is then free to swing downwardly under the influence of the spring 185. During such downward movement of the lever 176, the switch 182 is again returned to its normal condition, having the contact 183*b* closed and the contact 183*a* opened, as the machine is at rest in home position. As will be described in detail with reference to a specific operation of the invention, during an account-number-entering cycle, the number-checking device 38 is set up to receive the digit amounts from the various storage switches 131, this being done when the common contact 183 is transferred to close the normally-open contact 183*a* of the switch 182, and then at the end of the cycle, when such common contact 183 is again allowed to close the contact 183*b*, the checking operation is actually begun within the device 38**.

*Machine Reset Mechanism*

From the description thus far, it is known that after a non-add type of machine operation for entering the account or identification number into the checking device has been made and after the checking device completes its free-running operation for subjecting the entered number to its predetermined rule, a second machine cycle may be initiated for entering the item amount associated therewith, being an add type of machine operation, if the number entered into the checking device is approved thereby as conforming to the predetermined rule. Contrariwise, such second machine cycle is prevented whenever the entered account number is not approved by the checking device. In this instance, having the normally-closed relay contact 601*b*1 retained in an open condition under influence of the energized relay 601, special cycling means must be provided over and above any normal cycle-initiating means to reset the machine for receiving a new and corrected account number and deenergizing the control relay 601, so that the new account number may be received into the machine under the non-add type of operation.

Referring to FIGS. 1, 2B, and 10, the reset control key 40 includes a downwardly-extending key stem 200, slidingly guided for vertical movement along a plate 201, secured to the left vertical frame plate 56 of the machine. The securing means for the plate 201 consists of spaced-apart bolts 202 and 203, which also act as guides for the key stem 200. A spring 204, extending between a stud 205 mounted on the plate 201 and an outwardly-extending foot 206 of the key stem 200, yieldingly retains the reset key 40 in an upper, unoperated position, being overcome upon the depression of the key 40 and permitting the key stem 200 to move downwardly a distance determined by a slot 207 provided therein (FIG. 10). Rotatably mounted on a lower extending arm portion of the key stem 200 is a latch member 208, normally urged counter-clockwise by means of a spring 209, extending between said member 208 and an ear 210 of the key stem 200. Referring especially to FIG. 2B, such counter-clockwise movement of the latch member 208 during the unoperated condition of the reset key 40 is limited by a stud 195 of a subtract and add arm 194 being positioned, during the home position of the arm 194, in front of a forwardly-extending foot 211 of the latch member 208. This arm 194 is operated by means well known in the art, and, therefore, that precise structure with a detailed description thereof is deemed not necessary herein. For the sake of understanding the invention, it may be stated that the subtract and add arm 194 is secured to a cross shaft 196, which is oscillated first clockwise and then counter-clockwise, as seen in FIGS. 2B and 10, upon a like rocking of the rear drive shaft 68, as above mentioned. In essence, the rear drive shaft 68 has secured to its right end a drive plate (not shown herein) connected by a forwardly-extending link (also not shown herein) to a forward drive plate 197 (FIG. 3), which is secured to the forward drive shaft 196. Also as seen in FIG. 3, a strong spring 198 extends between the forward drive plate 197 and a stud 199, mounted adjacent the front of the machine, thus assuring that the forward drive shaft 196, with its associated members, is returned to a home position at the end of each machine cycle, such home position being the positioning of the various parts as shown in FIGS. 2A and 2B. With such a construction, as the rear drive shaft 68 is oscillated, the forward drive shaft 196 is oscillated likewise, and when for some reason the rear drive shaft 68 is restrained from such oscillation, the forward drive shaft 196, along with its subtract and add arm 194, is also restrained from such oscillation, even though the drive plate 78 (FIG. 2A) is driven a complete rotation by the motor 50. As above mentioned, the restraining of such oscillating movement of the rear drive shaft 68 and its interconnected forward drive shaft 196 is present when the machine becomes overloaded and the machine-driving connection is permitted to yield through the spring 88.

Mounted on the plate 201 a spaced distance below the foot 206 of the key stem 200 is a switch 212, having its actuating plunger 213 extending upwardly therefrom and in alignment with the foot 206. Referring to FIG. 2B, as the reset control key 40 is depressed, its foot 206 is moved downwardly to engage such switch plunger 213 and close the switch 212. At the same time, the latch member 208 is likewise moved downwardly a distance sufficient to remove its foot 211 from behind the stud 195 on the subtract and add arm 194, thus permitting the latch member 208 to be rocked counter-clockwise under urgence of the spring 209 and latch the reset key 40 in a depressed condition as the foot 211 moves under the stud 195 of the subtract and add arm 194.

Upon the initial closing of the switch 212, and during the period of time that the key 40 is held in a latched condition, an electric circuit is completed between the alternating current lines 41 and 42 (FIG. 16) for energizing a reset solenoid 216. This solenoid 216, like the tripping solenoid 113, is carried by the inverted T-shaped plate 170, herein shown as being carried forwardly thereunder rather than rearwardly thereunder, as is the case with the solenoid 113. As the solenoid 216 is energized upon the closing of the switch 212, its normally forwardly-extending plunger 217 is pulled rearwardly of the machine and, through a forwardly-extending link 218, rocks a bell crank 219 clockwise about its pivot stud 220, extending from the left vertical frame plate 56. This bell crank 219 is normally urged counter-clockwise by means of a spring 221, extending therefrom to a frame-carried stud 222, the extent of such counter-clockwise movement being controlled by a stop stud 223. A correction shaft 225, journaled in the vertical frame plates 56 and 95, extends across the front of the machine and fixedly carries on its outer ends, respectively, a shaft-actuating arm 226 and a key reset arm 227. Referring to FIGS. 2B and 11, the arm 226 is secured to the shaft 225 on the outer side of the left vertical frame plate 56, to be rocked counter-clockwise as the bell crank 219 is rocked clockwise upon the energization of the solenoid 216. For such rocking, a stud 224 extends outwardly from the upper end portion of the bell crank 219 to contact a lower extending portion of the arm 226, thus rocking the arm 226 counter-clockwise as the bell crank 219 is rocked clockwise. Also as seen in FIG. 2B, the correction key 29 has a lower extending key stem portion 49, resting against a roller 228, carried by an upper and rearwardly-extending portion of the arm 226, thus causing the shaft 225 to be rocked counter-clockwise again upon the depression of the correction key 29. It is therefore seen that the correction shaft 225 may be rocked counter-clockwise either by the correction key 29 or by energization of the reset solenoid 216.

Referring especially to FIG. 3, the key reset arm 227 is secured to the shaft 225 on the outer side of the right vertical frame plate 95 and extends rearwardly therefrom over a stud 301, carried by the forward end of a correction key lever 300. During the clockwise rocking of the shaft 225 as seen in FIG. 3, and its counter-clockwise rocking as seen in FIG. 2B, the arm 227 is rocked downwardly to rock the correction key lever 300 counter-clockwise (FIG. 3) about its pivot 302. As the lever 300 is rocked counter-clockwise, its forward end portion engages a stud 306 on a digit key release bail 305, thus rocking the bail 305 clockwise to release any digit keys depressed in the usual manner, as set out in the Fowler et al. United States Patent No. 2,745,601. Also, upon the counter-clockwise rocking of the lever 300, the stud 301 thereon engages a rearwardly-extending portion 231 of a total release arm 230, rocking said arm 230 counter-clockwise about its pivot 307 and actuating the disconnecting link 308 in the usual manner (also set out in United States Patent No. 2,745,601) for releasing both the total and the sub-total control keys if they have been depressed. In addition, during such counter-clockwise rocking of the lever 300, a roller 229, carried by the rearwardly extending portion thereof, contacts the under surface of a foot 311 and rocks clockwise a lever 310, which restores the non-add mechanism if the non-add key 32 has been depressed. Again, the specific structure of this lever 310, along with its associated non-add mechanism, is adequately set out in the reference United States Patent to Fowler et al., No. 2,745,601. With such mechanism as that which has been described herein, during the rocking of the correction shaft 225 under control of the reset solenoid 216, all digit keys which may have been depressed are released, the total and sub-total control keys are released if they have been depressed, and the non-add control key is also released if it has been depressed, such mass releasing operation being performed by the counter-clockwise rocking of the lever 300 under control of the reset arm 227. As above mentioned with reference to the latching of the reset key 40 in a depressed condition, the lever 300 (FIG. 3) is held in its counter-clockwise rocked position for the period of time that the solenoid 216 remains energized.

Referring further to FIG. 3, during the period of time that the lever 300 is retained in its rocked position by the arm 227, a rear end portion 303 thereof is positioned behind an ear 313 of the key release actuating lever 312. A spring 315 normally urges the lever 312 clockwise, and its rocking movement from the home position is permitted when the roller stud 197*a* on the plate 197 is moved from under a rearwardly- and downwardly-extending leg 317 during the first half of a machine cycle. The stud 197*a* rocks back to home position, as shown in FIG. 3, at the end of a machine cycle, at which time the digit keys are released in the usual manner through a pawl 318, pivotally carried by the lever 312. A machine full stroke locking bar 320 extends across the rear ends of all of the key banks and is yieldingly urged toward and outwardly from the right of the machine, such movement locking the digit keys from movement whether in normal or depressed position. Such outward movement of the bar 320 occurs when the rear end portion of the lever 312 is removed from in front thereof at the beginning of the machine operation. Return movement of the lever 312 at the end of a machine operation forces the locking bar 320 again to its inward position to permit selective depression of the digit keys for the next operation. To insure proper functioning of the full stroke locking bar 320, a three-armed interlock lever 321 is urged counter-clockwise about its pivot 323 by a spring acting on a rearwardly-extending arm thereof (not shown herein) to hold a downwardly- and forwardly-extending arm thereof against the stud 197*a* in the forward drive plate 197. In the home position of the drive plate 197 (FIG. 3), the forwardly- and upwardly-extending arm 322 of the lever 321 is located above the locking bar 320, but, as soon as the drive plate 197 starts its counter-clockwise rocking movement during the first half of the machine cycle, stud 197*a* thereof becomes ineffective and allows the lever arm 322 to drop toward the locking bar 320, which is then moved outwardly as the lever 312 moves clockwise and away therefrom. The arm 322, in continuing its movement, enters a notch (not shown herein) in the locking bar 320 to hold it in locking position during the remainder of the machine operation; that is, until the stud 197*a* returns clockwise back to home position. In the event that the locking bar 320 fails to move outwardly during a machine cycle, the arm 322 does not complete its full movement by entering into the notch therein, but rather engages a top surface thereof, at which time further counter-clockwise rocking of the forward drive plate 197 is blocked by the usual toe (not shown herein) of the lever 321 engaging a formation or abutment thereon, as set out in detail in the Fowler et al. United States Patent No. 2,745,601. Of course, as seen in the Fowler et al. patent, a limited counter-clockwise rocking movement of the drive plate 197 is always permitted during a machine cycle for dropping the lever arm 322 into operable engagement with the locking bar 320, which movement may then be either continued or restrained in accordance with the positioning of such locking bar 320.

Thus, in the usual and well-known manner, the stud 197*a* on the drive plate 197, as seen in FIG. 3, prevents the rocking movements of the levers 312 and 321 whenever the machine is in home position and likewise permits rocking thereof as the forward drive shaft 196 is started to be oscillated first counter-clockwise during each machine cycle. During each machine cycle, if the locking bar 320 has been permitted to move outwardly, as described above, the arm 322 of the lever 321 may enter the notch therein and complete its full downward movement, thus enabling the normal oscillation of the drive plate 197 to be completed. When, on the other hand, the locking bar 320, for one reason or another, is prevented from moving outwardly, as described above, the arm 322 of the lever 321 is prevented from completing its full downward movement, in turn preventing the drive plate 197 from being released for its full counter-clockwise and clockwise oscillations during the machine cycle. Under such circumstances—that is, where the locking bar 320 is prevented from moving outwardly—a complete counter-clockwise movement of the lever 321 about its pivot 323 is not permitted, and, although the machine crank or drive plate 78 (FIG. 2A) makes a complete revolution, the forward drive shaft 196 and the rear drive shaft 68 are restricted to their limited oscillating movements, as determined by the length of travel of the lever arm 322 before contacting the top surface of the locking bar 320. In this instance, and as above described with reference to the "short-stroke" cycle of the machine, the drive connection is permitted to yield as the stud 86 moves out of the notch in the drive plate 87, thus preventing the normal functioning of the machine from taking place during such a cycle.

As above mentioned with reference to the energization of the reset solenoid 216, and for the period of time that the solenoid 216 remains energized, the correction key lever 300 is held in its counter-clockwise movement, thus presenting its end portion 303 behind the ear 313 of the key release actuating lever 312 and preventing the normal clockwise rocking of the lever 312 to release the machine for a full stroke cycle. The energization of the solenoid 216 therefore conditions the machine for a "short-stroke" operation, since the locking bar 320 is not permitted to move outwardly and free the forward drive plate 197 for its full oscillating movement. Also, upon the initial energization of the solenoid 216, the digit and control keys are released during such "short-stroke" cycle in view of the clockwise rocking of the arm 227 and the various above-mentioned release mechanisms actuated thereby.

Referring to FIGS. 2B and 11, simultaneously with the rearward shifting of the plunger 217 upon the energization of the solenoid 216, a drive arm 235 is rocked clockwise about its mounting bolt 172. Such rocking of the arm 235 is provided through its downwardly-extending leg 236 being engaged by a stud 239 on the solenoid plunger 217, thereby limiting the clockwise movement thereof a set distance in accordance with the travel of the plunger 217. This arm 235, as best seen in FIG. 11, has a leg 237 extending under and inwardly of the left vertical frame plate 56 of the machine, is yieldingly urged counter-clockwise by a spring 247 extending therefrom upwardly to a frame-carried stud (not shown herein), and also has a leg 238 turned outwardly of the frame plate 56 at a zone rearward of the bolt 172. A machine cross brace, extending between the left and right vertical frame plates 56 and 95, has secured thereto a downwardly-extending bracket 240 by means of bolts 241 (one such bolt 241 being illustrated). A switch-actuating lever 242 is rockably mounted on the bracket 240 by means of a pivot bolt 243 and has secured to its forwardmost end portion a downwardly-extending block member 244. The bracket 240 also carries a pair of switches aligned with and positioned below the switch-actuating block 244, herein shown as being a normally open switch 245 and a normally closed switch 246. Although the precise transverse locations of the switches 245 and 246, along with their actuating means, are not illustrated in relation to the machine proper, it is sufficient to say herein that these members lie adjacent the inner surface of the left vertical frame plate 56 thereof.

Upon the energization of the reset solenoid 216, the drive arm 235 is rocked clockwise and, through its inwardly-extending leg 237, rocks the lever 242 clockwise to close the normally open switch 245 and open the normally closed switch 246, and, as indicated above, such switches 245 and 246 are held in their actuated positions for at least the period of time that the solenoid 216 remains energized; that is, as long as the control key 40 is latched in its depressed condition. Referring to FIG. 16, such closing of the switch 245 provides a circuit path to the trip solenoid 113, while such opening of the switch 246 breaks the holding circuit to the control relay 601.

In accordance with the above description of machine cycling under control of the reset key 40, the solenoid 216 remains energized for a short period of time only, becoming deenergized as the forward drive plate 197 receives its limited counter-clockwise movement (FIG. 3) during the first or "short-stroke" cycle thereof, the extent of which limited movement of the plate 197 is sufficient to release the depressed control key 40 as the stud 195 on the interconnected subtract and add arm 194 is rocked clockwise thereby (FIG. 2B) from over the foot 211 of the latch 208. Upon such deenergization of the solenoid 216, its plunger 217 is yieldingly urged forwardly of the machine under tension of the spring 221, thereby permitting the correction shaft 225 to be again rocked to its home position, as seen in FIG. 2B. As seen in FIG. 3, such rocking to home position of the shaft 225 is immediate, through the clockwise rocking of the lever 300, which, although not illustrated herein, is, in the usual manner, yieldingly urged in a clockwise direction by an appropriate spring stretched therefrom to interconnect the machine frame plate 95.

In order that such second machine cycle may be initiated immediately after the "short-stroke" cycle, such second cycle being a full-stroke cycle, the switches 245 and 246 must be retained in their actuated conditions at and beyond the end of such first machine cycle, during which the solenoid 216 has become deenergized. Referring to FIG. 16, it is seen that the retention of the switch 245 in a closed condition after the first cycle permits the tripping solenoid 113 to be again energized for rocking the trip latch 64 from under the ear 59 of the three-armed lever 58, as above described, provided that the switch 246 is also retained in an open condition for breaking the holding circuit to the control relay 601, thereby permitting such recycling circuit to be completed through the normally closed relay contact **601*b*1 within the tripping and blocking circuits. Again, as above described, as the switch 162 is transferred upon the energization of the tripping solenoid 113, the blocking solenoid 148 becomes energized to rock the blocking arm 158 also from under the three-armed lever 58, permitting further rocking thereof for closing the motor switch 51 and starting the motor 50 in operation for the second machine cycle. Therefore, as the stud 239 is moved rearwardly to rock the drive arm 235 clockwise against the tension of the spring 247, a lower foot member 251 of a latch arm 250 retains the drive arm 235 in its rocked position by extending under its outwardly-directed leg 238 as it is moved upwardly upon energization of the solenoid 216. Referring especially to FIGS. 2B and 10, the latch arm 250 is rotatably mounted on a frame-carried bolt 252, being yieldingly urged counter-clockwise by a spring 253, which presents its lower foot 251 in abutment with the leg 238 when the solenoid 216 is not energized (FIG. 11) and causes such foot 251 to rock under the leg 238 as the arm 235 is rocked clockwise upon the energization of the solenoid 216. Thus, upon the initial clockwise rocking of the arm 235 for actuating the switches 245 and 246 in the above manner, the latch arm foot 251 retains the arm 235 in such rocked condition to keep the switch 245 closed and the switch 246 open beyond the period of time the solenoid 216 is retained energized. A by-pass pawl 254 is pivotally carried on the upper end portion of the arm 250 by means of a stud 255. A spring 256, extending between a stud 257 of the pawl 254 and an ear 258 of the latch arm 250, normally urges the pawl 254 clockwise to present a forward end portion thereof in the path of movement of the roller stud 195 on the subtract and add arm 194. With such construction, it is seen that, as the forward drive shaft 196 is oscillated first clockwise (FIG. 2B) during the second cycle of the reset operation of the machine, the stud 195 on the subtract and add arm 194 may pass by the pawl 254 in the usual manner by tensioning the spring 256 thereof. Then, during the return rocking counter-clockwise of the arm 194, the stud 195 thereon contacts the pawl 254 and causes the latch arm 250 to rock clockwise and release its foot 251 from under the leg 238 of the drive arm 235. Of course, in view of the limited oscillation of such subtract and add arm 194 during the earlier short-stroke cycle of the machine reset operation, the stud 195 thereon, at that time, will fall short of by-passing the pawl 254, thereby not performing such latch arm 250 releasing operation. Upon such removal of the foot 251, near the end of the second machine cycle, the spring 247 rocks the arm 235 counter-clockwise and permits the switches 245 and 246** to again open and close, respectively, as the machine reaches home position. The machine is now ready to receive a new and corrected account number under the usual non-add type of operation.

With reference to the normal cross-tabulating type of carriages above referred to in the specification, such reset operation is performed after the carriage has automatically shifted to and is retained in its second columnar position, since the machine is not then operable for receiving the item amount associated with an uncheckable number. Therefore, such second and full-stroke cycle of the machine under the reset operation causes the carriage to return again to its first columnar position while spacing up the listing tape 25 for a new line of printing. In like manner, with reference to the fixed type of carriage above referred to, the carriage has not shifted after such first account-number-entering cycle, and such second cycle of the reset operation simply spaces up the listing tape **25*a*** for receipt of the new account number.

OPERATION

A. *Independent Operation of Calculating Machine*

Before going into a typical operation of the calculating machine associated with the number-checking device 38, it is advisable to point out that such machine may be operated independently of the device 38; that is, used solely as a calculating means and not as input means for the number-checking device. In this instance, and referring to FIG. 16, the switch 35 would be transferred to its dash-line position, where power from the source 33 would not be present for operating the checking device 38. Under such circumstances, the calculating machine may be cycled in the following manners. Upon the depression of the selected control key, after the amount to be entered into the machine has been set up on the digit keys 26, the trip latch 64 is manually rocked from under the lever 58 as above described, permitting it and the associated lever 62 to rock a distance sufficient to close the normally open contact **169*a* of the switch 169 (FIG. 8), which in turn completes a circuit to the blocking solenoid 148. Upon the energization of the solenoid 148, the blocking arm 158 is removed from under the lever 58, whereby continued rocking thereof is permitted for closing the motor switch 51 and starting the motor 50 in operation. In this instance, it is seen that the trip solenoid 113 needs no energizing circuit since the trip latch 64 is manually rocked under control of the cycle-initiating key depressed. Also, the slight movement of the levers 58 and 62 from a latched condition to a blocking condition is sufficient to permit the common contact 169 of the switch 162 to be transferred for completing the circuit to the blocking solenoid 148**.

An additional means for cycling the calculating machine may be had through use of the key-responsive cycling means. Referring further to FIG. 16, upon the closing of the switch 36, the machine is conditioned for cycle initiation under control of the digit keys 26. When the last digit of an item amount is set up on the digit keys, further depression of the selected key causes the switch 114 to be closed, as described above, thereby completing a circuit through the normaly closed contact 169*b* of the switch 162, the switch 36, and the switch 114 for energizing the tripping solenoid 113. As the solenoid 113 is energized, the trip latch 64 is removed from under the lever 58, and, in a manner described above, upon the rocking of the lever 62, the switch 162 is transferred to complete a circuit through the contact 169*a* for energizing the blocking solenoid 148. Again, as the solenoid 148 becomes energized, the blocking arm 158 is shifted so that the motor switch 51 may be closed. Under such key-responsive cycling means, the trip latch 64 is rocked under control of the tripping solenoid 113, whereas, under the above-mentioned control key initiation of a machine cycle, the trip latch 64 is manually rocked under control of the control key depressed. In either event, upon the rocking of the trip latch 64, the common contact 169 of the switch 162 is permitted to transfer and complete the circuit to the blocking solenoid 148, thereby permitting the motor 50 to be energized.

B. *Machine Operation With Associated Number-Checking Device*

In a general description of a typical operation of the present invention, it may be stated first that the switches 34 and 35 are manually closed to present electrical power from the source 33 (FIG. 16) to both the calculating machine and the number-checking device. In this instance, and referring to the above description relating to independent operation of the calculating machine, the switch 35 would be transferred from its dash-line position to the solid-line position to present a path for current flow through the rectifier 44, as above described. The individual digits making up the account or identification number to be checked may now be set up on the keys 26.

At this point, the specific operation of the invention depends upon the type of calculating machine employed; that is, whether it has a cross-tabulating type of carriage or a fixed carriage, and also whether it includes the key-responsive cycle-initiating means. For the sake of simplicity, and to present the usual type of machine adapted for checking account and identification numbers, the following operation is that for a machine having a shiftable carriage pre-conditioned by the control bar stop members to provide for two columnar positions in each line of printing and to provide for a non-add type of machine operation when the carriage is in the first columnar position with an add type of machine operation when the carriage is in the second columnar position. With such automatic conditioning of the machine by the carriage mechanism for both columnar positioning and type of machine operation performed at each column, the non-add control key 32, as above described, becomes ineffective during the checking operation. Also, such machine may not include key-responsive cycling means, and therefore the normal cycling of the machine in all instances is initiated through depression of the add control key 27.

After such account number has been set up on the digit keys 26 and the motor bar 27 is depressed for causing the machine to cycle, a non-add type of machine operation is performed automatically under control of the positioning of the carriage 23 to present a printed record of the account number in the first, or left-hand, columnar position of the tape 25, as seen in FIG. 14. As the machine begins cycling, the selecting arm 142 is shifted to present the pin 143 above the non-add plunger 141 of the switch 140 (FIG. 12). At the same time, the diverging levers 125 are rocked in accordance with the specific digit keys depressed to present pins 129 above selected plungers 132 of the storage switches 131 (FIG. 13). Then, near mid-cycle of the machine operation, guide and actuating members 130 and 144 are shifted, as above described, to depress the switch plungers selected, thus entering the digit amount set up on the keys 26 into the storage switches 131 and calling the number-checking device 38 into operation.

Referring to FIG. 16, this calling-in of the checking device 38 consists essentially of energizing the control relay 601 through the circuit including the type of operation switch 140 along with the control switch 182. As above described, the contact 183*a* of the switch 182 is also closed near mid-cycle of the machine and, through the latching structure set out above, remains closed until the very end of the machine cycle. Therefore, during such non-add operation, the control relay 601 becomes energized initially near mid-cycle and remains energized through its initiating circuit until the machine again reaches home position, at which time the switch 140 remains closed but the contact 183*a* of the switch 182 again assumes its normally open condition.

Looking further to FIG. 16, upon such initial energization of the relay 601 and during the period of time that it remains energized, a plurality of relay contacts are affected thereby. As above mentioned, the normally open contact 601*a*1 becomes closed and completes the circuit for energizing the lamp 37, thus indicating that the entered digit amount is to be checked by the device 38. Also, the normally closed relay contact 601*b*1 becomes opened and breaks the circuit to both the tripping solenoid 113 and the blocking solenoid 148, thus preventing initiation of a new cycle of the calculating machine prior to completion of the account-number-checking operation. In addition, a normally open contact 601*a*2 becomes closed to provide, through a normally closed relay contact 602*b*1 and the switch 246, a seal in path or holding circuit for retaining the relay 601 energized beyond the end of the machine cycle; that is, after its initiating circuit through the switches 140 and 182 is broken, as above described, when the machine returns to home position. A final relay contact, herein disclosed as the normally open contact 601*a*3, also becomes closed to apply, through the normally closed reset relay contact 603*b*1, a reset voltage through the various number-checking elements provided within the device 38. These elements, herein designated generally by the numeral 280, include the various cores and windings which are thereby returned to a pre-checking condition to accommodate the digits entered into the storage switches 131 during the non-add operation of the calculating machine. Therefore, during each non-add machine cycle, such windings and cores are transferred from a set, or post-checking, condition, corresponding to the last account number checked, to a home, or pre-checking, condition, to accommodate the new account number entered during the cycle. The specific structure and mode of operation of the various elements contained within the device 38 are described in the previously mentioned United States patent applications Serial No. 699,984 and Serial No. 773,761, and additional discussion thereof is not deemed necessary herein.

At the end of such non-add cycle of the machine, at which time the motor switch 51 has been restored to its open condition and the switch 182 has been unlatched to return to normal, the machine carriage is automatically tabulated to its second, or right-hand, columnar position through the associated control mechanism, which also conditions the machine for an add type of operation. Upon such unlatching of the switch 182 at this time, restoring the contact 183*b* to its normally closed condition and restoring the contact 183*a* to its normally open condition, a circuit is completed through the contact 183*b* and the control relay contact 601*a*3 to energize the reset relay 603 (FIG. 16). Thus, as the machine reaches home position, the relay 603 becomes energized. When energized, this relay 603 opens the contact 603*b*1 for removing the above-described resetting voltage from the various windings and cores and causing the checking device 38 to begin its checking operation immediately. A normally open relay contact 603$a1$ is also closed by the relay 603 at this time, providing a potential circuit path for energizing the sensing relay 602 (representing relays RY and RYC of the reference applications) if, after the checking operation, the account number entered into the machine storage switches 131 conforms to the predetermined rule of the device 38.

At this stage of the operation, the various digits representing the account number to be checked have been entered into the machine storage switches 131, the number has been printed in the first columnar position on the tape 25, the machine has come to rest at home position and may not be again cycled at this time, and the machine carriage has been shifted to the second columnar position, whereupon the machine is conditioned for an add type of operation only, should a second machine cycle be permitted for entering the item amount associated with the account number to be checked. In view of the holding circuit including the relay contact 601$a2$, the relay contact 602$b1$, and the switch 246, the relay 601 is energized and prevents the machine from being now tripped, since the contact 601$b1$ thereof is held open. The relay 603 is also now energized through the circuit including the relay contact 601$a3$ and the switch contact 183$b$, opening the contact 603$b1$ for removing the resetting voltage and causing the checking device to begin its checking operation.

The checking device 38 now begins a free-running operation; that is, operates wholly independently of the calculating machine, which is now at rest, and for the period of time necessary to receive and check the plurality of digits entered into the storage switches 131. In this regard, and in accordance with the disclosures of the reference United States patent applications Serial No. 699,984 and Serial No. 773,761, each switch 131 is interrogated, and the digit amount contained therein is entered into counter mechanism within the device 38, the total of which is then transferred to the accumulator means thereof. Referring to FIG. 16, a controller 285, representing the machine control devices "G" and "G2" along with their associated electrical components as disclosed in the above reference applications respectively, is included in the checking device circuitry as means for approving or not approving the accumulated digits making up the entered account or identification number. This controller 285, being in the form of a multi-vibrator, becomes active and permits a machine release circuit to be completed when the subjected number conforms to the predetermined rule of the device 38. In like manner, a non-conforming account number prevents the controller 285 from becoming active, thereby preventing such circuit from being completed.

Referring to FIG. 14, an illustrative account number 133436600 is employed as conforming to the rule of the checking device 38; that is, as a number which will be approved thereby. Such number has been entered into the storage switches 131 of a calculating machine; has been recorded in the first columnar position on the tape 25; and, in view of the above description, will permit the controller 285 to become active at the end of the non-add cycle of the calculating machine. Also, as above stated, during the checking operation, the calculating machine is in its second columnar position, awaiting approval of the entered number from the device 38, so that a second cycle of the machine may be initiated for entering into its totalizer mechanism and printing at the second columnar position the item amount associated therewith, or non-approval thereof, which requires resetting the machine as described later, for entering a new and corrected account number.

With the entry of our account number 133436600 during the non-add operation of the machine, being the first cycle thereof, and after the period of time required by the device 38 in checking the entered number, at which time the device 38 automatically comes to rest, the controller 285 is presented in an active state to complete the above-mentioned control circuit through the path of the reset relay contact 603$a1$ and the control relay contact 601$a3$ for energizing the sensing relay 602. Upon the energization of the relay 602, its normally closed contact 602$b1$ is opened to break the above-described seal in path or holding circuit for the control relay 601, thereby causing the relay 601 to be deenergized. When deenergized, the relay 601 permits its contact 601$a1$ to again open and break the circuit to the lamp 37. The relay contact 601$b1$ becomes closed again to provide a circuit path for energizing the tripping solenoid 113 and the blocking solenoid 148, so that the calculating machine may now be cycled for entering the item amount, herein illustrated as $26.25, associated with the account number into the machine totalizer mechanism and cause that amount to be printed in the second columnar position on the tape 25 under an add type of machine operation. The relay contact 601$a2$ is also returned to its normally open condition, as seen in the holding circuit (FIG. 16), and the final relay contact 601$a3$ is also returned to its open condition, breaking the circuits to both the reset relay 603 and the sensing relay 602, thereby presenting all of the relays 601, 602, and 603 in deenergized conditions.

Referring to FIG. 14, after completion of the second machine cycle, wherein the item amount has been entered into the machine and printed on the tape 25, the carriage 23 is driven back to its first columnar position, and the tape 25 is spaced up for receipt of the next account number and the item amount associated therewith.

Continuing the operation of the invention, a second item amount, herein illustrated as $7.95 in FIG. 14, is also associated with the account number 133436600. Therefore, upon such return of the machine to its first columnar position as above set out, the operator again enters the account number 133436600 on the digit keys 26 and depresses the control key 27, which causes the machine to cycle under the non-add type of operation. In setting up such account number on the digit keys 26, it may be assumed that the operator inadvertently depressed a number 2 digit key for a number 3 digit key, therefore entering the number 132436600 into the storage switches 131 rather than the correct number. In accordance with the above description, at the end of the checking operation by the device 38, the controller 285 is not presented in an active state, since the account number entered does not conform to the predetermined rule thereof. Again, after the non-add cycle of the machine, the carriage is shifted to its second columnar position for receipt of the item amount associated with the entered account number if it is approved by the device 38. In this instance, since the controller 285 does not become active at the end of the checking operation, the above control circuit for energizing the sensing relay 602 is prevented from being completed, thereby keeping the relay 602 in a deenergized condition. Thus, its contact 602$b1$ remains closed under such circumstances to retain the seal in path or holding circuit which keeps the control relay 601 in an energized state. While the relay 601 remains energized, its contact 601$a1$ is closed to complete the circuit to the lamp 37, and its contact 601$b1$ is held open, thus breaking the circuits to both the tripping solenoid 113 and the blocking solenoid 148, so that the calculating machine is now inoperable and, through its closed contact 601$a3$ and the contact 183$b$ of the switch 182, completes a circuit for energizing the reset relay 603. It is thus seen that the control relay 601 and the reset relay 603 are now energized due to the entered account number's being not approved by the checking device 38, causing the lamp 37 to be lighted and preventing the machine from being cycled in its second columnar position for entering the item amount of $7.95 associated with the account number. Further operation of the calculating machine is thus prevented under control of normal cycle-initiating means. Therefore, a reset operation must be performed in order that the correct account number, 133436600, may be entered into the machine and checked by the device 38.

Depending upon the alertness and speed of the machine operator, the item amount associated with the account number may be set up on the keys 26 and the control key 27 depressed before it is realized that an error has been made in the entering of the account number, at which time the machine fails to cycle, or such error may be realized prior to that time upon the operator's seeing that the indicator lamp 37 remains in its illuminated condition. In either event—that is, whether the operator realizes the error and does not enter the item amount on the keyboard, or does not realize the error until after such amount has been set up and the control key 27 depressed—the reset key 40 must be depressed in order to permit the machine to cycle and shift back to the first columnar position for receiving the corrected number. Upon the depression of the reset key 40, the switch 212 is closed and is latched in such closed condition by the foot 211 of the latch member 208 extending under the stud 195 of the subtract and add arm 194, as above described. Referring to FIG. 16, upon the closing of the switch 212, a circuit is completed for energizing the reset solenoid 216, this solenoid 216 remaining energized throughout the period of time that such switch 212 is latched closed. Immediately upon such energization of the solenoid 216, the link 218 is pulled rearwardly of the machine to rock the correction shaft 225, which, through the reset arm 227, secured thereto (FIG. 3), releases any digit and control keys which may have been depressed by an operator failing to see the warning lamp 37, as above mentioned. In addition, the rocking of the shaft 225 along with the arm 227 conditions the machine for a short-stroke cycle, thus preventing any item amount set up on the digit keys 26 from being printed in the second columnar position of the tape 25 (FIG. 14). Simultaneously with the rocking of the correction shaft 225, the solenoid 216 rocks the drive arm 235, which closes and opens, respectively, the switches 245 and 246 (FIG. 11). Upon the initial rocking of the arm 235, the latch arm 250 is permitted to rock and latch such arm in its rocked position, thereby keeping the switches 245 and 246 actuated beyond the period of time that the solenoid 216 remains energized. Referring to FIG. 16, it is seen that, as the switch 246 is opened, the holding circuit to the control relay 601 is broken, thereby permitting its associated contacts to assume their normal positions, which causes the reset relay 603 to become deenergized through opening of the contact 601*a*3, causes the lamp 37 to be extinguished through opening of the contact 601*a*1, and, through the closing of the contact 601*b*1, permits the circuits to be completed for energization of the tripping solenoid 113 and the blocking solenoid 148, so that the machine may be cycled for the reset operation. In this instance, and simultaneously with the actuation of the switch 246, the closing of the switch 245 completes the circuit for energizing the tripping solenoid 113, which rocks the trip latch 64 as above described permitting the lever 58 to rock a distance sufficient to complete a circuit through the switch contact 169*a* for energizing the blocking solenoid 148, thus removing the blocking arm 158 from under the lever 58, so that the motor switch 51 may be closed in the usual manner. From the description throughout the specification, it is seen that the rocking of the correction shaft 225 is simultaneous with the rocking of the drive arm 235, the shaft 225 releasing all of the depressed keys and conditioning the machine for a short-stroke cycle, while the arm 235 actuates the switches 245 and 246, which permit the machine to begin cycling.

In view of the fact that the switch 245 is held closed throughout the short-stroke cycle of the machine and for a period of time thereafter by the latch arm 250, a second machine cycle is initiated thereby for returning the machine carriage to its first columnar position and spacing up the listing tape 25. Since the short-stroke cycle conditioning means is reset before the end of such short-stroke cycle of the machine this second machine cycle constitutes a full stroke of the machine, whereby the subtract and add arm 194 on the forward drive shaft 196 is rocked first clockwise and then counter-clockwise. See FIG. 2B. At the end of such rocking, the drive arm 235 is released from its latched condition, thereby permitting the switch 245 to open again and the switch 246 to close again as the machine reaches home position. During such second cycle of the machine under the reset operation, the number-checking device 38 is not called in, as above described with reference to the non-add cycle of the machine, in view of the above-mentioned conditioning for an add type of machine operation at the second columnar position, thereby not selecting and depressing the non-add plunger 141 of the switch 140, which, as seen in FIG. 16, completes the circuit for energizing the relay 601 within the device 38.

Referring to FIG. 14, it is seen that, during a checking operation wherein an erroneous account number has been entered, the second columnar position thereafter remains free of any printed impression, to indicate that the preceding account number has not been approval by the checking device 38. Upon the completion of such reset operation, which permits a new and correct number to be entered as above described, continued operation of the machine is permitted for again entering such number in the first columnar position, which, if approved by the checking device 38, permits the item amount associated therewith to be entered into the machine totalizer mechanism and recorded thereafter in the second columnar position, this being indicated in the third vertical line of printing, which includes the item amount consisting of $7.95.

Referring to FIG. 15, wherein a listing tape 25*a* associated with a fixed-carriage type of calculating machine is disclosed, substantially the same operational procedure may be employed for the checking operation. In this instance, a single column of vertically-spaced-apart printing lines is illustrated for alternate recording of the various account numbers entered for checking and the item amounts associated therewith. As above mentioned in reference to such a machine, the non-add control key 32 provides a first machine cycle initiating means for entering the account number, and the add control key 27 provides the second cycle initiating means for entering the item amount associated therewith. The reset mechanism under control of the key 40 again provides for a two-cycle machine operation, the first cycle of which is a short-stroke cycle for releasing any depressed digit and control keys, while the second cycle is a full-stroke cycle for spacing up the listing tape 25*a*. Again, the short-stroke cycle prevents any item amount set up on the keys 26 from being printed when the preceding account number is not approved by the device 38, thereby leaving blank the printing line immediately therebelow.

As set out earlier in the specification, the key-responsive cycling means may be associated with either the cross-tabulating type of carriage machine or the fixed carriage type of machine. In either instance, and as illustrated in FIG. 16, additional pressure applied to the last digit key 26 depressed initiates a machine cycle. Under the operation of such mechanism, both the non-add cycle and the add cycle of a shiftable carriage type of machine may be initiated by the last digit key 26 depressed, this being true because the machine has been pre-conditioned as to the type of operation under the positioning of the paper carriage 23. Such mechanism, when associated with a fixed carriage type of machine, permits its second cycle only to be so initiated, this being the add type of cycle, since the first, non-add, cycle thereof must necessarily be initiated by the non-add control key 32.

While the forms of mechanism shown and described herein are admirably suited to fulfill the objects primarily stated, it is to be understood that it is not intended to confine the invention to the forms or embodiments disclosed herein, for it is susceptible of embodiment in various other forms, all coming within the scope and spirit of the invention. Therefore, we do not desire to be limited to that precise form of the invention beyond the limitations which may be imposed by the following claims.

What is claimed is:

1. In combination with a checking device for receiving and subjecting data to a predetermined rule thereof and having control means positioned according to the conformity of such data with such rule, a machine of the class described for entering data into said device, comprising a cyclically-operable main drive means; first latch means normally positioned for blocking operation of said drive means; second latch means also normally positioned for blocking operation of said drive means; manually-operable trip means for initiating operation of said drive means; means responsive to said trip means for moving said first latch means to a non-blocking position with respect to said drive means; means also responsive to said trip means for moving said second latch means to a non-blocking position with respect to said drive means; data storage mechanism; means for entering data into said storage mechanism during operation of said drive means; control means responsive to operation of said drive means for initiating an operation of said checking device; interlock means also responsive to operation of said drive means for overcoming the second latch means moving means, whereupon said second latch means may return to its normal position for blocking further operation of said drive means by said trip means during operation of said checking device; and sensing means responsive to the positioning of said checking device control means, said sensing means being effective for overcoming said interlock means and permitting further operation of said drive means by said trip means when the data entered into the storage mechanism conforms to the checking device predetermined rule, and said sensing means being not so effective when the data entered into the storage mechanism does not conform to the checking device predetermined rule.

2. In combination with a checking device for receiving and subjecting data to a predetermined rule thereof and having control means positioned according to the conformity of such data with such rule, a machine of the class described for entering data into said device, comprising a cyclically-operable main drive means; first latch means normally positioned for blocking operation of said drive means; second latch means also normally positioned for blocking operation of said drive means; machine type of operation conditioning means providing a first and a second type of machine operations; manually operable trip means for initiating both said first and said second types of machine operations; means responsive to said trip means for moving said first latch means to a non-blocking position with respect to said drive means; means also responsive to said trip means for moving said second latch means to a non-blocking position with respect to said drive means; data storage mechanism; means for entering data into said storage mechanism during machine cycling under said first type of operation; control means responsive to machine cycling under said first type of operation for initiating an operation of said checking device; interlock means also responsive to machine cycling under said first type of operation for overcoming the second latch means moving means, whereupon said second latch means may return to its normal position with respect to the drive means for blocking further machine operation by said trip means during operation of said checking device; and sensing means responsive to the positioning of said checking device control means, said sensing means being effective for overcoming said interlock means and permitting initiation of said second type of machine operation by said trip means when the data entered into the storage mechanism conforms to the checking device predetermined rule, and said sensing means being not so effective when the data entered into the storage mechanism does not conform to the checking device predetermined rule.

3. The combination of claim 2 including manually operable reset means for overcoming said interlock means and initiating a third type of machine operation when the data entered into the machine storage mechanism does not conform to the checking device predetermined rule; said third type of machine operation being effective for resetting the calculating machine for a new first type of operation thereof by said trip means.

4. In a calculating machine adapted to enter data into and initiate operation of a checking device electrically intercoupled therewith, which checking device during operation, subjects such data to a predetermined rule thereof, and which checking device, after operation thereof, either approves or disapproves such data in accordance to its conformity with the predetermined rule, the combination of a machine drive means; machine type of operation conditioning means providing a first and a second type of machine operations; a latch member normally positioned for restraining operation of said drive means; a blocking member also normally positioned for restraining operation of said drive means; manually operable trip means for initiating both said first and said second type of machine operations; a trip lever activated by said trip means for removing said latch member from its drive means restraining position; a first circuit means also activated by said trip means for removing said blocking member from its drive means restraining position; data storage mechanism; means for entering data into said storage mechanism during machine cycling under said first type of operation; a second circuit means activated during said first type of machine operation for both initiating an operation of the checking device and deactivating said first circuit means, whereupon said blocking member is permitted to return to its normal position for restraining further machine operation by said trip means during operation of the checking device; and a third circuit means becoming activated after operation of the checking device is completed if the data entered into the storage mechanism is approved by the checking device, said third circuit means deactivating said second circuit means and permitting the initiation of said second type of machine operation by said trip means.

5. The machine of claim 4 including a fourth circuit means for simultaneously deactivating said second circuit means and initiating a third type of machine operation; and a manually operable machine reset means for activating said fourth circuit means if said data entered into the storage mechanism is not approved by the checking device; said third type of machine operation returning the calculating machine to that condition which permits a new first type of operation thereof to be initiated by said trip means.

References Cited in the file of this patent

UNITED STATES PATENTS

| | | |
|---|---|---|
| 2,220,502 | Weinlich | Nov. 5, 1940 |
| 2,692,726 | Frieberg | Oct. 26, 1954 |
| 2,947,475 | Rauch | Aug. 2, 1960 |